United States Patent [19]
Da Silva et al.

[11] Patent Number: 5,661,557
[45] Date of Patent: Aug. 26, 1997

[54] COMBINED COMPLEMENTARY FILTERING SPECTRUM ANALYSIS DEVICE, IN PARTICULAR FOR RAMAN SPECTROMETRY

[75] Inventors: Edouard Da Silva, Lille; Michel Delhaye; Jacques Barbillat, both of Villeneuve d'Ascq, all of France

[73] Assignee: Dilor, Lille, France

[21] Appl. No.: 549,071

[22] Filed: Oct. 27, 1995

[30] Foreign Application Priority Data

Oct. 28, 1994 [FR] France .................. 94 13001

[51] Int. Cl.$^6$ .................. G01J 3/44; G01N 21/65
[52] U.S. Cl. .................. 356/301
[58] Field of Search .................. 356/301

[56] References Cited

U.S. PATENT DOCUMENTS

| | | | |
|---|---|---|---|
| 5,112,127 | 5/1992 | Carrabba et al. | 356/301 |
| 5,247,343 | 9/1993 | Burch | 356/346 |
| 5,424,825 | 6/1995 | Delhaye et al. | 356/318 |

FOREIGN PATENT DOCUMENTS

| | | |
|---|---|---|
| 0535753A2 | 4/1993 | European Pat. Off. . |
| 0543578A1 | 5/1993 | European Pat. Off. . |

OTHER PUBLICATIONS

Munsok Kim et al, "High–Performance Raman Spectroscopic System Based on a Single Spectrograph, CCD, Notch Filters, and a Kr+ Laser Ranging from the Near–IR to Near–UV Regions", Applied Spectroscopy, vol. 47, No. 11 Nov. 1, 1993, pp. 1780–1783.

Collins et al, "Continuously Tunable Optical Filter for Use in Resonance Raman Spectroscopy", Applied Optics, vol. 16, No. 1, Jan. 1, 1977, pp. 252–254.

*Primary Examiner*—F. L. Evans
*Attorney, Agent, or Firm*—Spencer & Frank

[57] ABSTRACT

A sample which is exposed to excitation radiation scatters light to a separator filter. The scattered light includes a Raman spectrum. The separator filter reflects, a spectral band of the radiation which it receives and transmits, the remainder of the radiation which it receives. The reflected spectral band is centered on the excitation radiation. The spectral band is collected and guided to a band-eliminating filter in order to eliminate therefrom a spectral band which is narrower than the reflected spectral band, and which embraces the wavelength of the excitation radiation. The band-eliminating filter has a steep elimination slope. A signal corresponding to the reflected spectral band, from which the narrow band has been eliminated in this way, is combined with the radiation transmitted by the separator filter and the combined radiations are supplied to a detection and analysis unit.

24 Claims, 25 Drawing Sheets

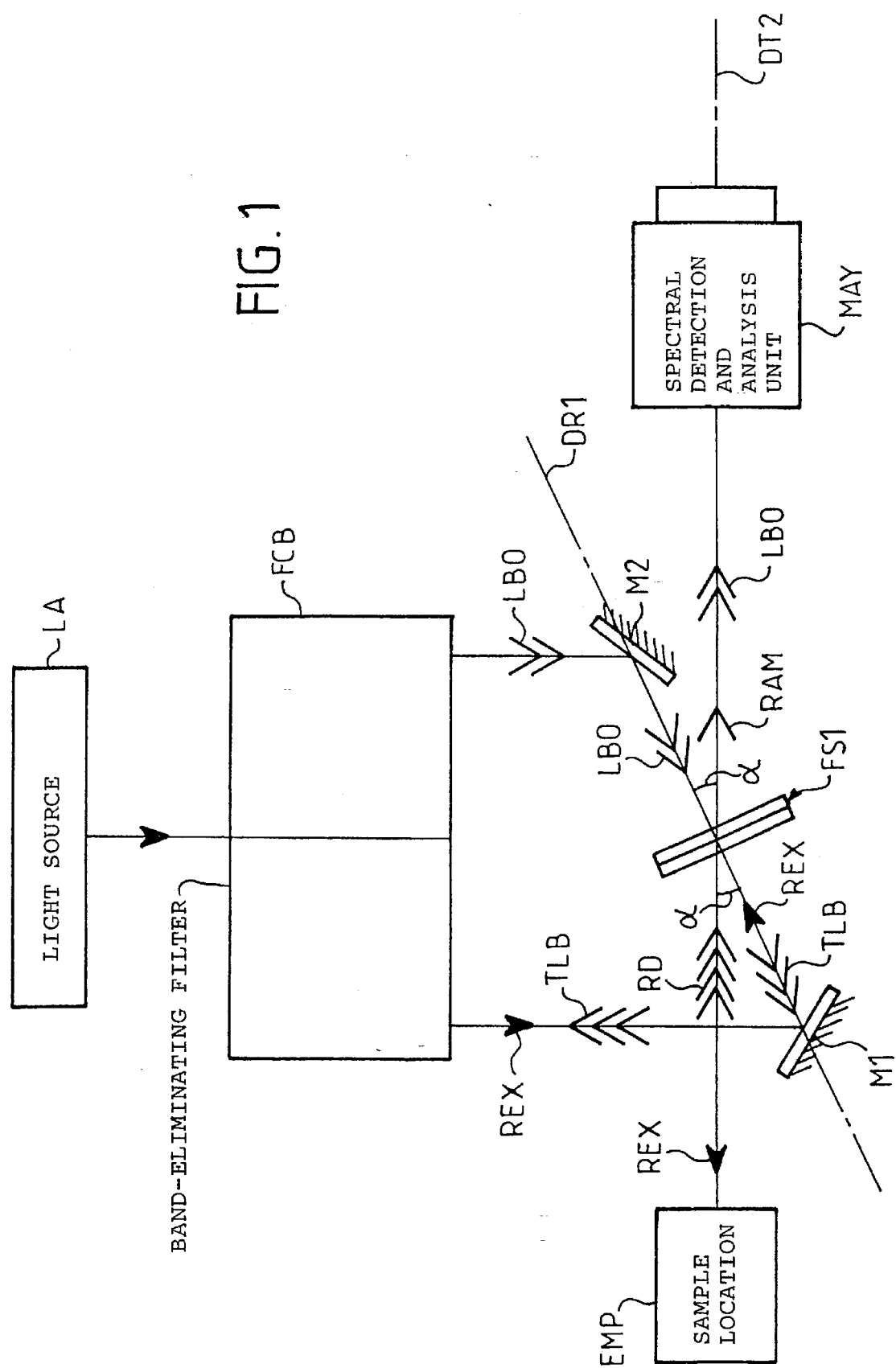

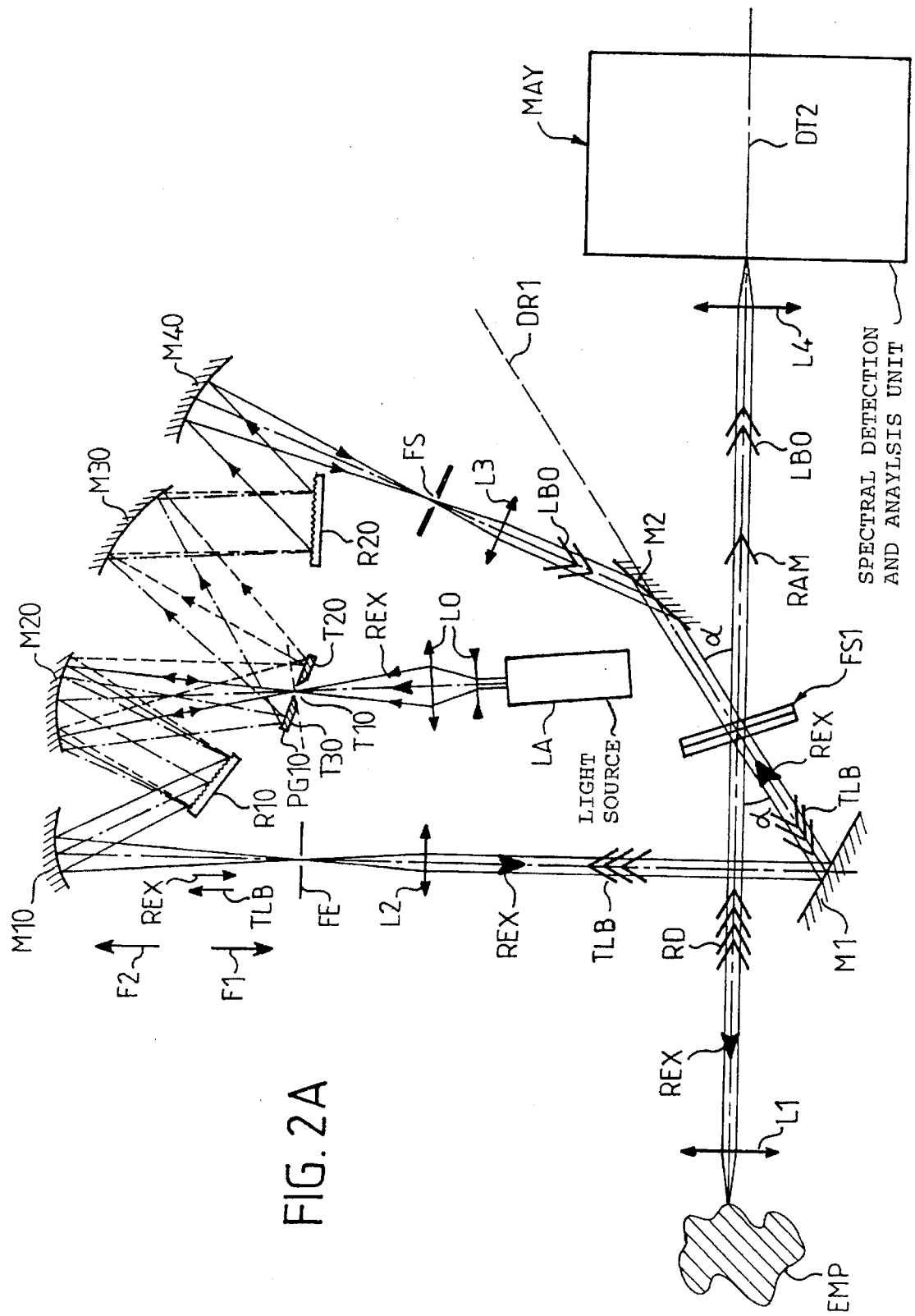

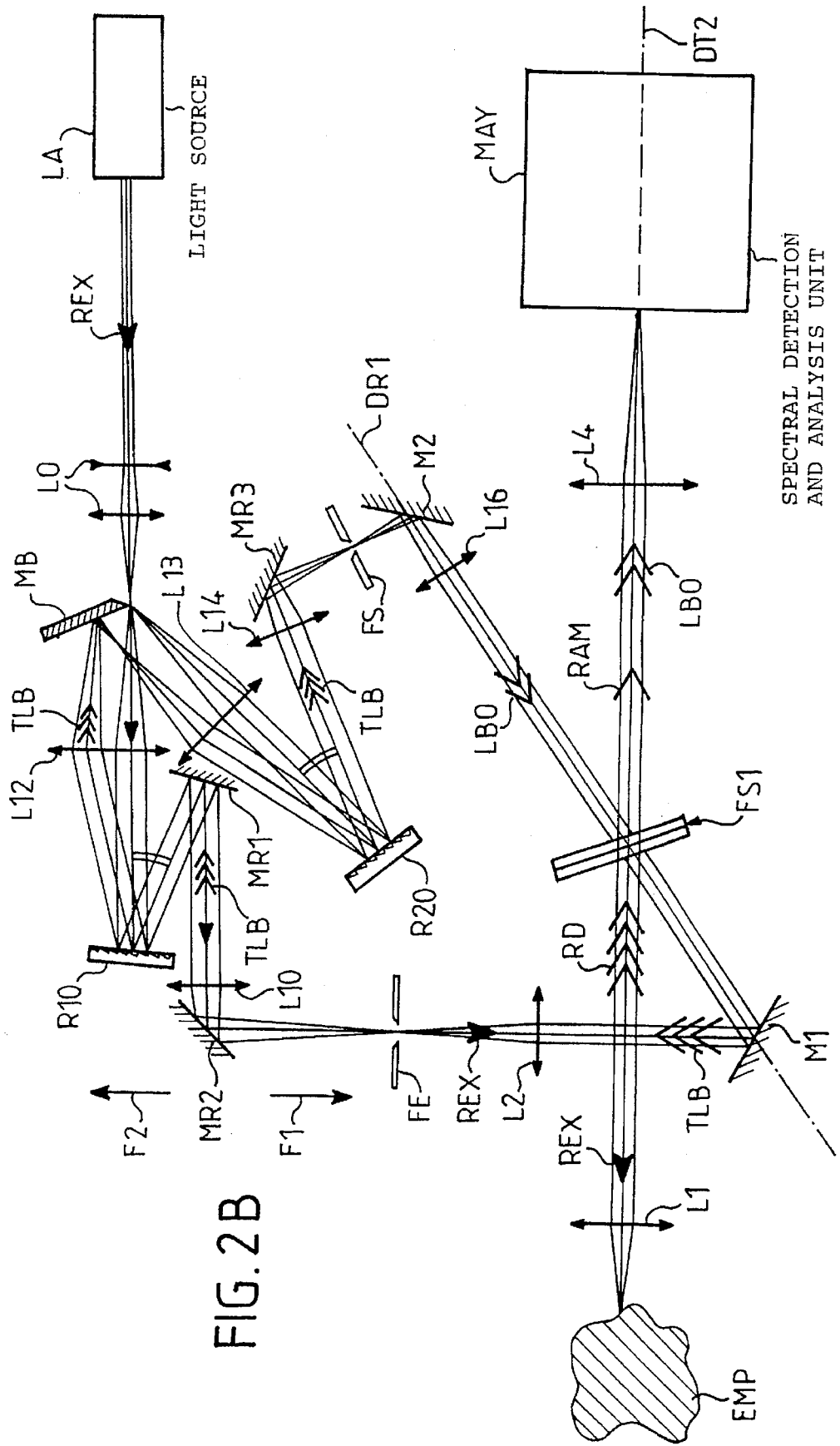

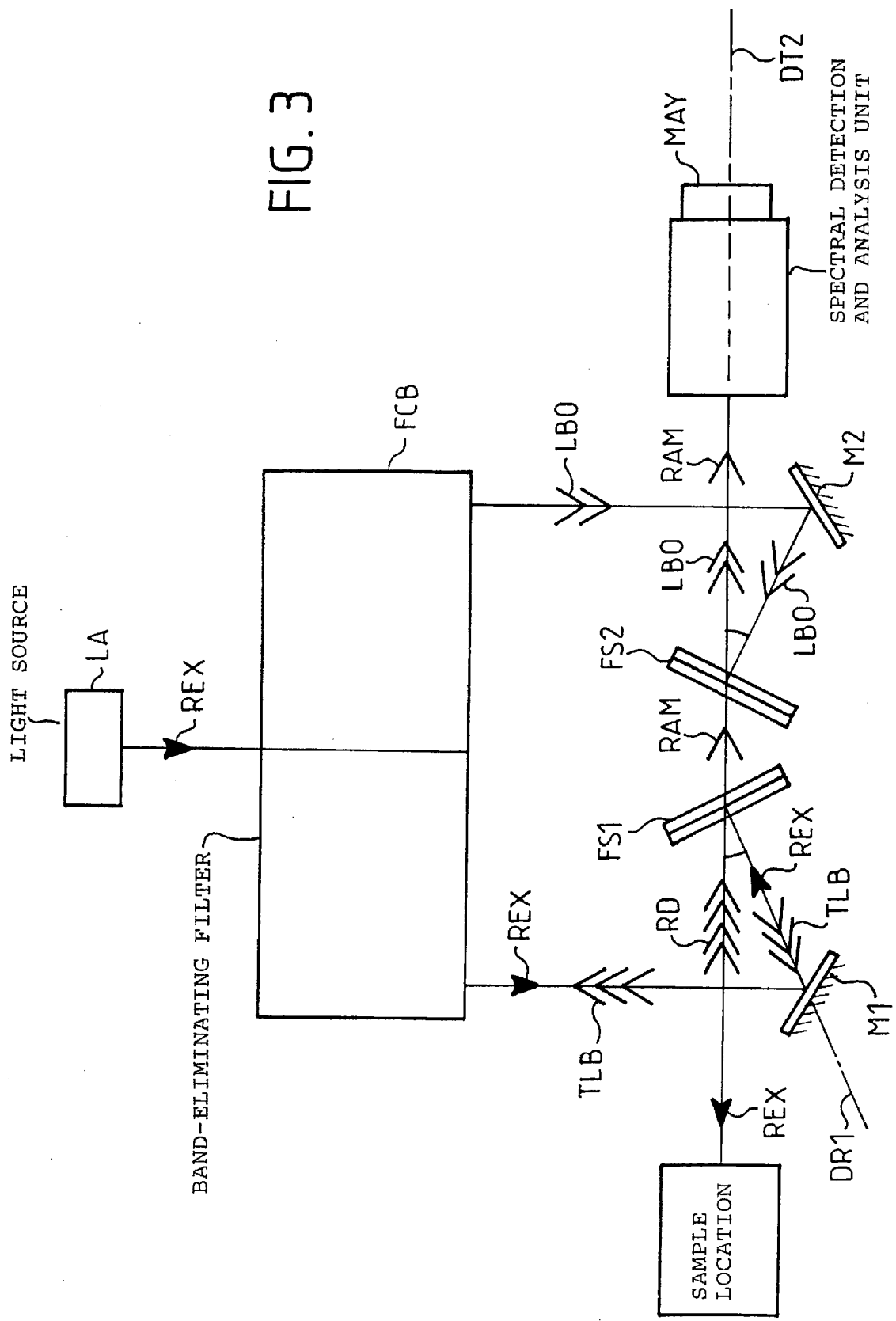

COMBINED COMPLEMENTARY FILTERING SPECTRUM ANALYSIS DEVICE, IN PARTICULAR FOR RAMAN SPECTROMETRY

BACKGROUND OF INVENTION

The present invention concerns combined complementary filtering spectrum analysis.

It is used generally in spectrum analysis, and more precisely in RAMAN spectrometry.

In the document FR-A-2 681 941, the Applicants have already proposed a RAMAN spectrometry spectrum analysis device which comprises:

- a source for producing excitation radiation of a predetermined wavelength;
- a location for a sample to be analyzed;
- means for guiding the excitation radiation onto a sample placed in the location;
- a separator filter for reflecting, in a first direction, a first spectral band of the radiation it receives and which transmits, in a second direction, the remainder of the radiation which it receives, the first spectral band being centred on the wavelength of the excitation radiation and the remainder of the radiation transmitted by the separator filter corresponding to the desired RAMAN spectrum;
- means for collecting the radiation scattered by the excited sample, and for guiding it onto the separator filter;
- spectral detection and analysis means disposed in the second transmission direction; and
- means for collecting the RAMAN spectrum transmitted by the separator filter, and guiding it onto the detection and analysis means.

Here, the separator filter separates the polychromatic radiation scattered by the sample into transmitted radiation and reflected radiation.

In practice, the transmitted radiation comprises the useful spectrum which is characteristic of the sample to be analyzed. For example, in RAMAN spectrometry, the useful spectrum is the so-called. "RAMAN" spectrum resulting from the wavelength changing effect accompanying the scattering of the light by the sample when the latter is illuminated by monochromatic excitation radiation. In contrast, the reflected radiation is restricted to a spectral band centred on the wavelength of the excitation radiation corresponding to the RAYLEIGH scattering line without a wavelength change.

Most frequently, the separator filter is of the type which rejects a relatively narrow spectral band ("notch"), such as dielectric multilayer interference filters, so-called ASHER colloidal filters, or holographic filters. This type of filter is advantageously easy to use and has a very high transmission coefficient outside the band to be eliminated.

However, the disadvantage of this type of filter is that it has a relatively flat elimination slope (non-steep edges) and a rejection or elimination band which is relatively wide in comparison with the excitation line to be eliminated.

The result of the above is that useful data, which is characteristic of the sample to be analyzed and known to the person skilled in the art as "low frequency lines", is not transmitted by the separator filter to the detection and analysis means but is eliminated (reflected) with the excitation radiation, which results in a significant loss of data.

A known solution is to use the separator filter as a high-pass or low-pass filter, set at the wavelength of the excitation line. However, the disadvantage of such a solution is that it eliminates either the STOKES part or the ANTIS-TOKES part of the RAMAN spectrum.

Another solution would be to use a narrow band-eliminating-type separator filter having a steep eliminating slope. However, such a filter is not at present technically viable.

SUMMARY OF THE INVENTION

The applicants set themselves the task of providing a spectrum analysis device which enables all the useful data, in particular the low frequency lines of the RAMAN spectrum, to be retained whilst using an imperfect separator filter, for example of the "notch" type.

The present invention proposes a solution to this problem. Its subject is a device of the above-mentioned type which is characterized by the fact that it additionally comprises:

- a band-eliminating filter with a steep eliminating slope, which filter can reject a second spectral band which is narrower than the first spectral band, and embraces the wavelength of the excitation radiation;
- means for collecting the first spectral band of the radiation reflected by the separator filter, and for guiding it onto the band-eliminating filter in order to eliminate the second spectral band therefrom; and
- means for collecting the radiation coming from the band-eliminating filter and for guiding it onto optical means which combines it, in the second direction, with the RAMAN spectrum transmitted by the separator filter, such that the detection and analysis means process the complementary radiation combined in this way.

The advantage of such a device is that a complete RAMAN spectrum is reconstituted, by recombining the medium and high-frequency parts with the low-frequency part which is usually lost, and guiding the spectrum reconstituted in this way to the detection and analysis means. Under these conditions, the RAMAN spectrum analyzed comprises more information than in the previous devices using an imperfect, notch-type separator filter. Highly advantageously, the band-eliminating filter with a steep elimination slope comprises a double subtractive monochromator having two diffraction gratings and a reflection/transmission light trap, said trap being interposed between the two gratings in order to allow the excitation radiation to pass towards the sample in the advance direction of the optical path and to trap the excitation radiation present in the first spectral band reflected by the separator filter in the return direction of the optical path.

Advantageously, the device according to the invention attains high transmission in the entire useful spectral band of the RAMAN spectrum, together with a very steep attenuation slope having the elimination wavelength corresponding to the excitation line to be eliminated.

In practice, the separator filter can rotate by a predetermined angle in order to displace and adjust precisely the wavelength of the elimination band of said separator filter.

This rotation causes a movement in space of the reflected beam, which complicates coupling to the optical elements disposed upstream and/or downstream of the separator filter.

Mechanical systems are known which, via pinions, bring about the coupled rotation of a plurality of filters arranged in series. However, the disadvantage of such systems is that they are not sufficiently accurate. Moreover, the movement of the beams necessitates the use of large filters.

An object of the present invention is also to propose a satisfactory solution to this problem.

This object is achieved by a device of the type described above in which the separator filter can receive the radiation coming from the sample in an incidence direction corresponding to the second direction, and can reflect, in the first direction, the first spectral band to a component which can compensate the angular deviation of the separator filter, the device being characterized in that the mechanism can entrain the deviation-compensating component in such a way that the compensator component rotates by the same angle as that of the separator filter so as to reflect the first spectral band in the third predetermined direction.

In practice, the mechanism comprises at least one bracket having an angle $\gamma$ in which $\gamma=C+180°/2$ and having:

a first rigid leg mounted so as to slide in translation through an aperture in the support of the separator filter mounted such that it is fixed in translation; and a second rigid leg bearing the compensator component; the apex of the bracket being subject to movement in translation along an axis disposed at a bisecting angle between the incidence direction and the third direction.

BRIEF DESCRIPTION OF THE DRAWINGS

Further characteristics and advantages of the invention will emerge from the following detailed description and the appended drawings, in which:

FIG. 1 shows schematically a combined complementary filtering RAMAN spectrometry device according to the invention;

FIG. 2A is a combined complementary filtering spectrum analysis device according to the invention in which the band-eliminating filter with a steep eliminating slope comprises a double subtractive monochromator and a reflection/transmission light trap according to the invention;

FIG. 2B shows the device of FIG. 2A in which concave reflective mirrors are replaced by lens objectives according to the invention;

FIG. 3 is a schematic representation of the device described in FIG. 1 using two separator filters arranged in series to carry out the combined complementary filtering according to the invention;

FIGS. 18A to 23 show schematically the self-alignment device according to the invention when the incidence direction DT2 and the output direction DR3 are parallel with each other.

DESCRIPTION OF THE PREFERRED EMBODIMENTS

In the remainder of the description, the spectrum analysis is of the RAMAN effect type. However, it is clear that the invention, in particular the combination of complementary filtering, can be applied to any type of spectrum analysis, for example emission, luminescence, phosphorescence, or fluorescence filtering, etc.

FIG. 1 shows a spectrum analysis device articulated about a conventional separator filter FS1, for example a notch filter, which will be described in greater detail below.

The source LA produces excitation radiation REX of a predetermined wavelength $\lambda 0$. For example, the source LA may be an ionized argon laser source emitting a monochromatic light beam REX having a wavelength $\lambda 0$ of 488 nm or 514.5 nm.

A sample holder or location EMP is provided for accommodating a sample to be analyzed. Generally, the location EMP is situated in a predetermined position relative to a microscope objective when the spectrum analysis is of the micro-sample type. The excitation radiation REX is guided by optical means which will be described in greater detail below onto the sample positioned at the location.

The radiation RD emitted or scattered by the sample subjected to excitation is guided onto the filter FS1.

In known manner, the separator filter FS1 can firstly reflect, in a first direction DR1, a first spectral band TLB of the radiation RD which it receives. The spectral band TLB embraces the wavelength of the excitation radiation REX. Secondly, the separator filter FS1 transmits, in a second direction DT2, the remainder RAM of the radiation RD which it receives. The remainder RAM of the radiation which it receives corresponds to the RAMAN spectrum here.

Spectral detection and analysis means MAY are disposed in the second direction DT2 in order to detect and analyze the RAMAN spectrum transmitted in this way by the separator filter FS1.

The incidence direction of the scattered radiation RD corresponds in this case to the transmission direction DT2. This transmission direction DT2 forms an angle α relative to the reflection direction DR1. For example, the angle α may be of the order of 7° to 11°. Quite clearly, other values of the angle α may be suitable for implementing the invention.

In order to comprehend properly the essential advantages afforded by the device according to the invention, the spectral responses of the constituent components of the device should first be described.

Figure 10:
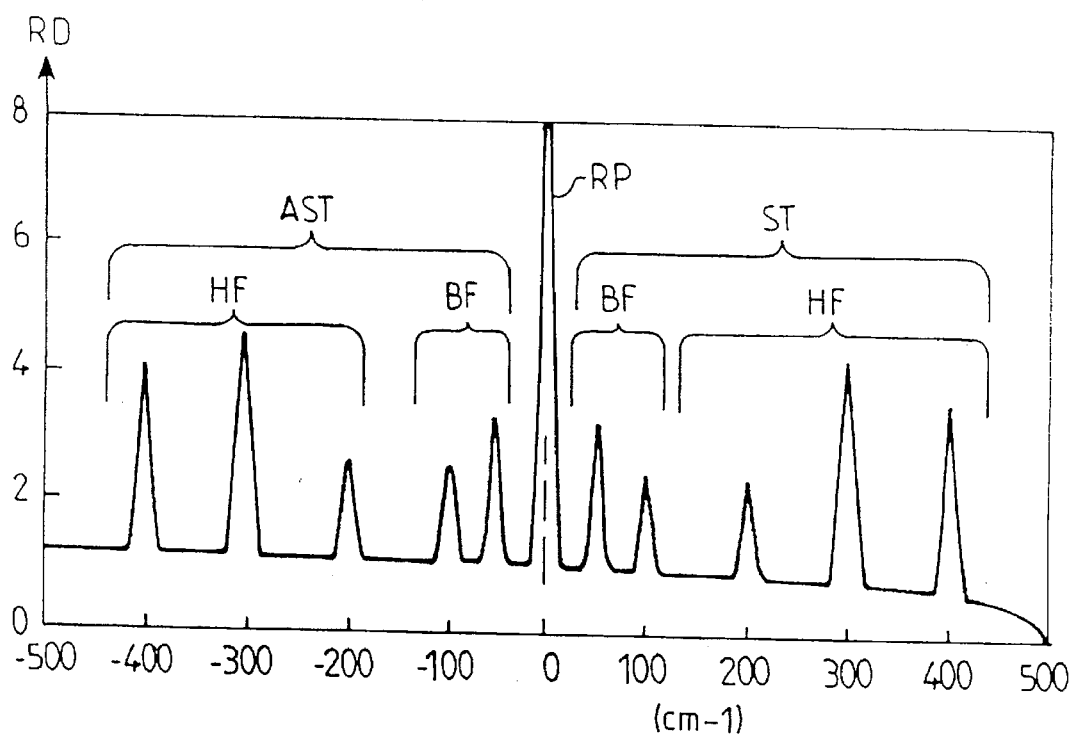
FIG. 10 shows the radiation spectrum curve scattered by the sample in the presence of a slight parasitic background simultaneously comprising the low, medium and high frequencies in the Stokes and antiStokes parts.

FIG. 10 shows the radiation spectrum RD scattered by the sample subjected to excitation. The x-axis shows the number of waves in cm−1. The y-axis shows the intensity of the scattered radiation by means of a unit chosen arbitrarily.

The origin of the x-axis is centred on the wavelength λ0 of the excitation radiation REX. The scattered radiation RD is polychromatic and comprises a principal line RP of high intensity, known as a RAYLEIGH distribution line, which represents the scattering line without a change of wavelength. The radiation RD also comprises a given number of fine lines of Stokes and antiStokes RAMAN spectra ST and AST, respectively. These lines are symmetrical relative to the line RP, of different intensities, and represent the scattered lines having a wavelength which changes owing to the RAMAN effect.

It is these fine lines disposed about the principal excitation line which represent and characterize the sample to be analyzed. The lines disposed in the vicinity of the excitation line are known as "low-frequency BF" lines by the person skilled in the art, whilst the lines remote from the excitation line are known as "medium and high-frequency lines HF".

Figure 9:
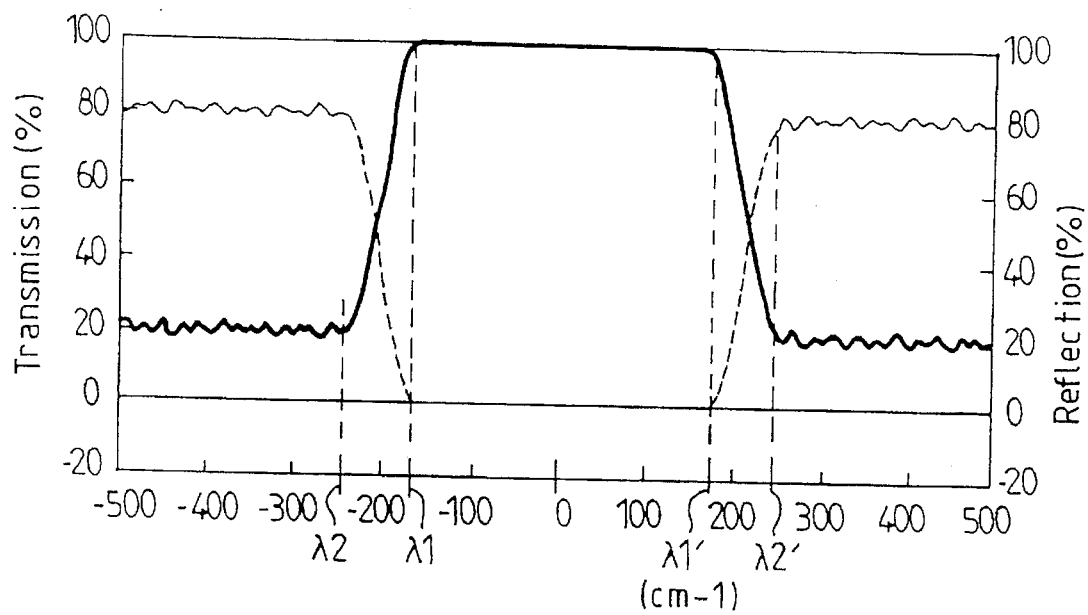
FIG. 9 shows schematically the spectral response curve of a conventional notch-type separator filter centred on the excitation wavelength $\lambda 0$.

FIG. 9 shows the spectral response of a conventional separator filter, for example of the notch type. The x-axis shows the number of waves in cm−1. The y-axis shows the transmission or reflection coefficient as a percentage.

The spectral response of the separator filter has a profile with a generally rectangular shape and edges which are not steep, the response being centred on the wavelength λ0. The separator filter has a high reflection coefficient for the line to be eliminated RP, an eliminating band which is relatively wide relative to the line to be eliminated, a flat eliminating slope and a high transmission coefficient outside the eliminating band. More precisely, the filter is a pass filter, with a maximum transmission value, for radiation having a wavelength of less than λ1' and more than λ1. It attenuates and reflects, with a low transmission value, radiation having a wavelength of less than λ2 or more than λ2'. The spectral band is known as being of the type having non-steep edges in so far as the eliminating slope (between λ2 and λ1 or between λ1' and λ2') is flat, and the radiation having a wavelength of between λ2 and λ1 or between λ1' and λ2' is progressively attenuated.

It should be noted that a separator filter of this type has a complementary transmission/reflection spectral response. In this case, the transmission curve is shown as a thick line whilst the reflection curve is shown as a thin line.

Generally, the filter FS1 is used to eliminate the excitation line scattered without a wavelength change by the sample with extremely high relative intensity, whilst the RAMAN spectrum (Stokes and antiStokes lines) is transmitted so as to be analyzed by the detection and analysis means.

Given the spectral response of the separator filter described above, the low-frequency lines BF are not transmitted towards the detection and analysis means but are eliminated (reflected) with the excitation radiation, resulting in a significant loss of data.

Figure 11:
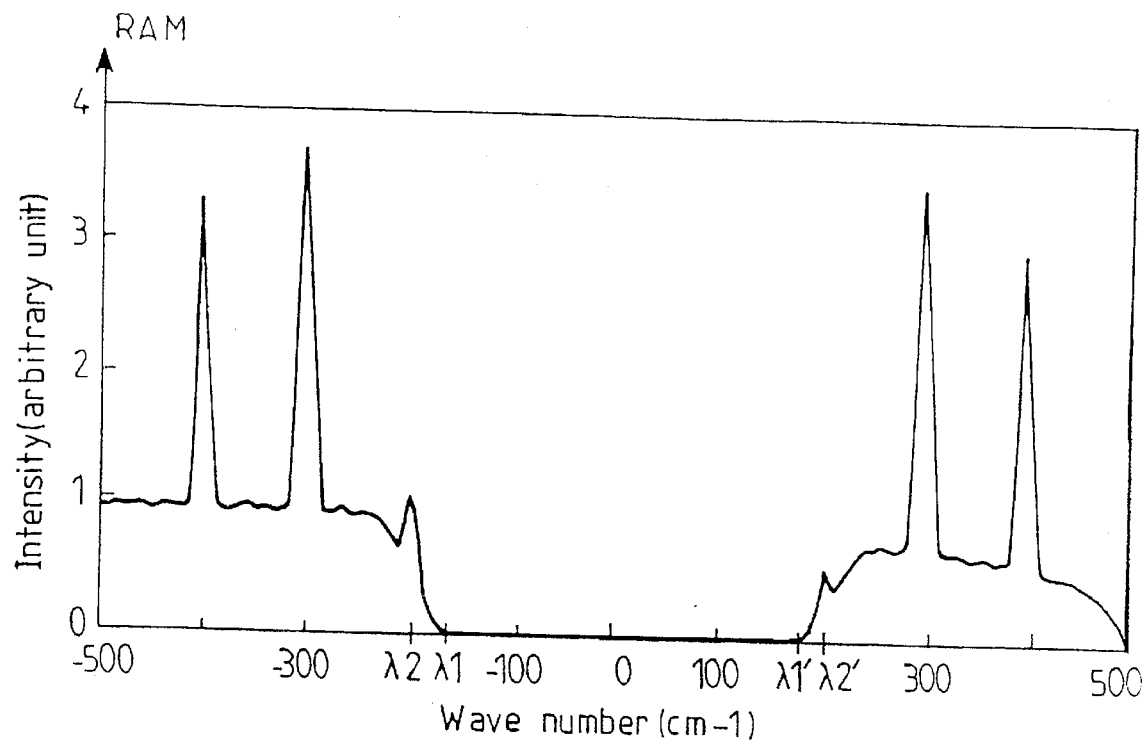
FIG. 11 shows the RAMAN spectrum transmitted by a conventional separator filter of which the low frequencies are eliminated between $\lambda 1$ and $\lambda 2$.

FIG. 11 shows the RAMAN spectrum transmitted by the separator filter FS1. This spectrum RAM comprises the lines having a wavelength of less than λ2 and more than λ2' which are totally transmitted by the filter FS1. The lines having a wavelength of between λ1 and λ1' are highly attenuated then reflected by the filter FS1.

In addition, the lines (here, the low frequency lines) of which the wavelength is between λ2 and λ1, on the one hand, and between λ1' and λ2', on the other, are weakly transmitted by the filter FS1 since they are situated in the elimination zone of the filter where the slope is not very steep.

Figure 12:
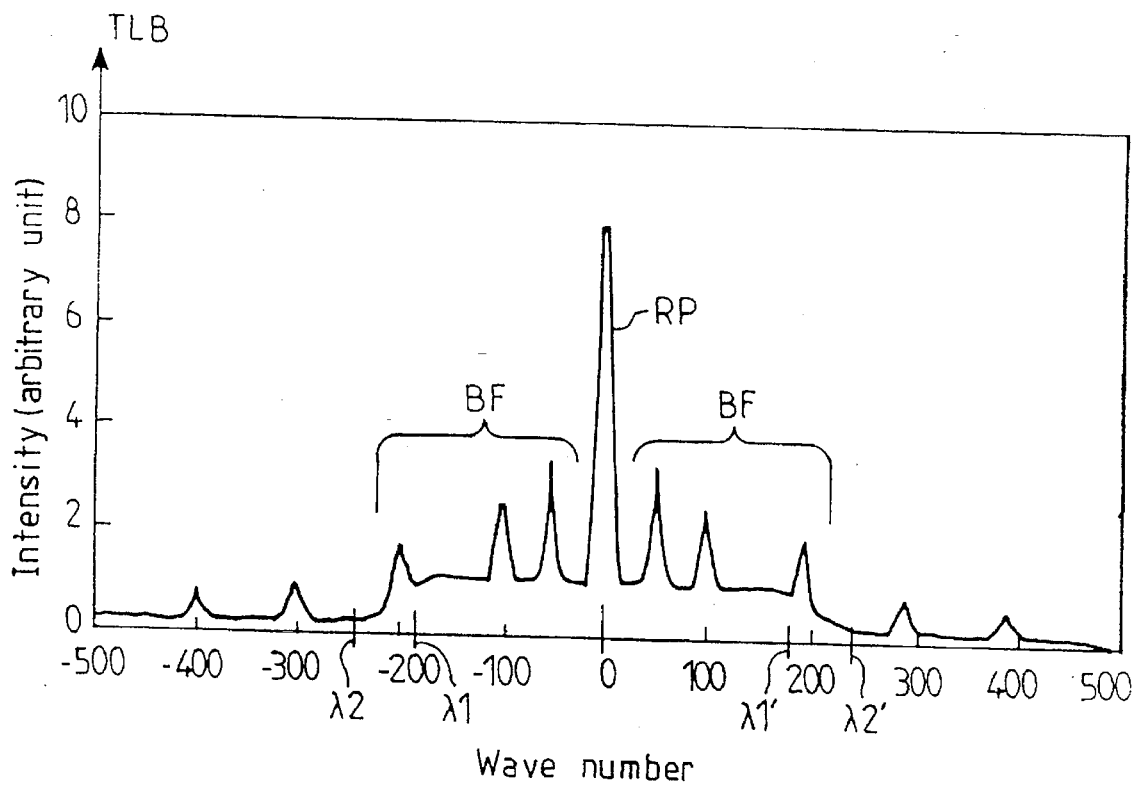
FIG. 12 shows the spectrum reflected by a conventional separator filter.

FIG. 12 shows the radiation spectrum TLB reflected by the filter FS1. It comprises a band which is relatively wide compared with the excitation line to be eliminated, embracing said excitation line λ0.

Generally, the separator filter FS1 operates by multiple order interference. It is selected from the group comprising notch filters, filters with semi-transparent mirrors, interferential filters operating by reflection, so-called ASHER colloidal filters, dielectric multilayer filters, LIPPMAN-type filters with an index grating, or holographic-type filters.

Reference will now be made again to FIG. 1.

According to the invention, there is provided a band-eliminating filter FCB, which will be described below in greater detail and which can reject, from the signal TLB reflected by the separator filter FS1, a second spectral band ET which is narrower than the first spectral band, with steep edges or a steep band-eliminating slope and embracing the wavelength of the excitation radiation REX.

More precisely, the first spectral band of the radiation TLB reflected by the filter FS1 is firstly guided onto the band-eliminating filter FCB. Then, collection means are provided to collect the signal LBO filtered by the band-eliminating filter FCB and combine it by optical combination means with the spectrum RAM in the transmission direction DT2. The optical combination means reflect the signal LBO exactly in the second transmission direction DT2, which enables it to be combined in complementary manner with the spectrum RAM transmitted by the separator filter.

Referring to FIG. 1, the optical combination means comprise the separator filter FS1 and a mirror M2 arranged relative to each other such that they guide the signal LBO in the direction DT2 without losses.

The complementary combination of the signals LBO and RAM according to the invention will be better understood by means of the following spectral responses.

Figure 13:
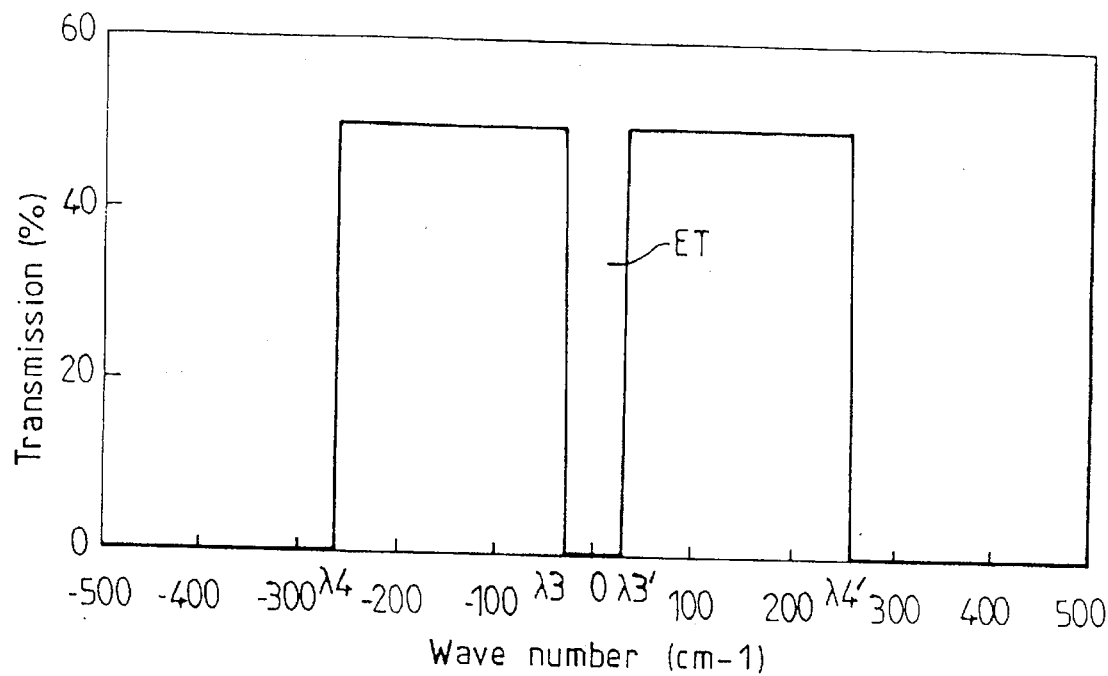
FIG. 13 shows the spectral response curve of a conventional band-eliminating filter with a steep eliminating slope.

FIG. 13 shows the typical spectral response of a conventional band-eliminating filter, which can reject a narrow band ET with steep edges, also known as the steep band-eliminating slope-type. Transmission is substantially zero for the wavelengths between λ3 and λ3'. The narrow band ET is here centred on the wavelength λ0 corresponding to the wavelength RP of the excitation radiation REX. For the lines between λ4 and λ3, on the one hand, and the lines between λ3' and λ4', on the other, the band-eliminating filter has, for example, a transmission coefficient of more than 50%.

Figure 14:
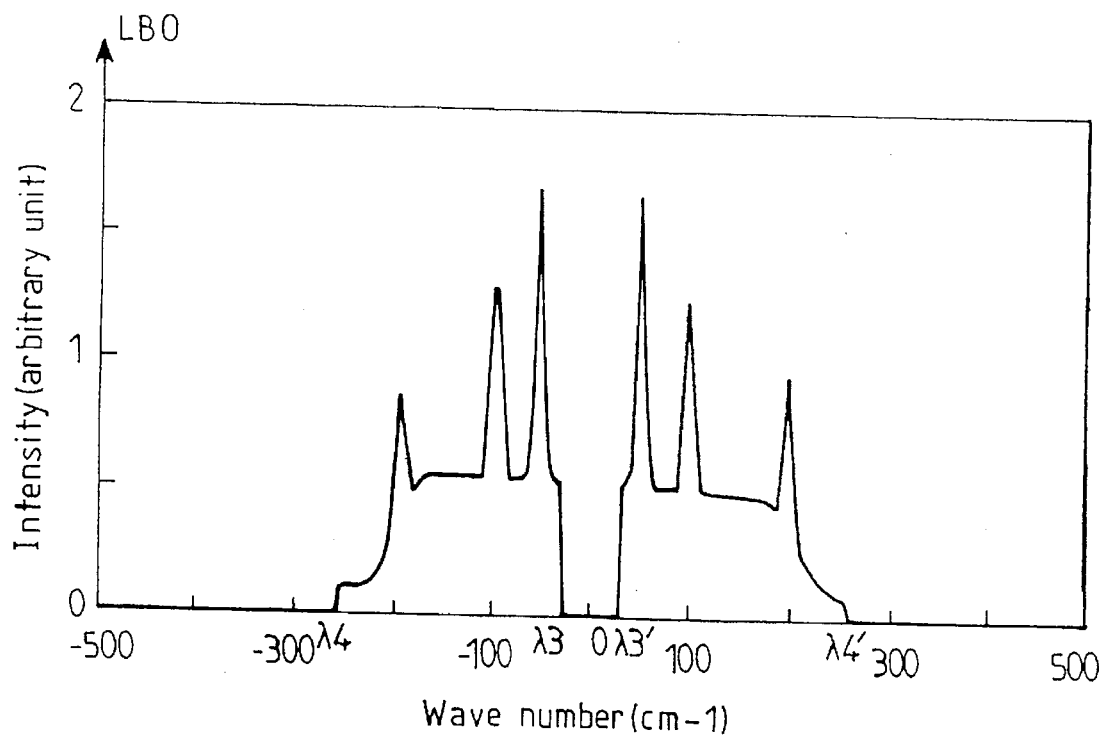
FIG. 14 shows the signal reflected by a conventional separator filter then filtered according to the invention by a conventional band-eliminating filter having a steep eliminating slope.

FIG. 14 shows the radiation spectrum LBO reflected by the separator filter FS1 and filtered by the band-eliminating filter FCB according to the invention. It should be noted that the signal LBO here corresponds to the spectral band TLB from which the narrow band ET, i.e. the excitation line of wavelength λ0, has been eliminated (LBO=TLB−ET).

Figure 15:
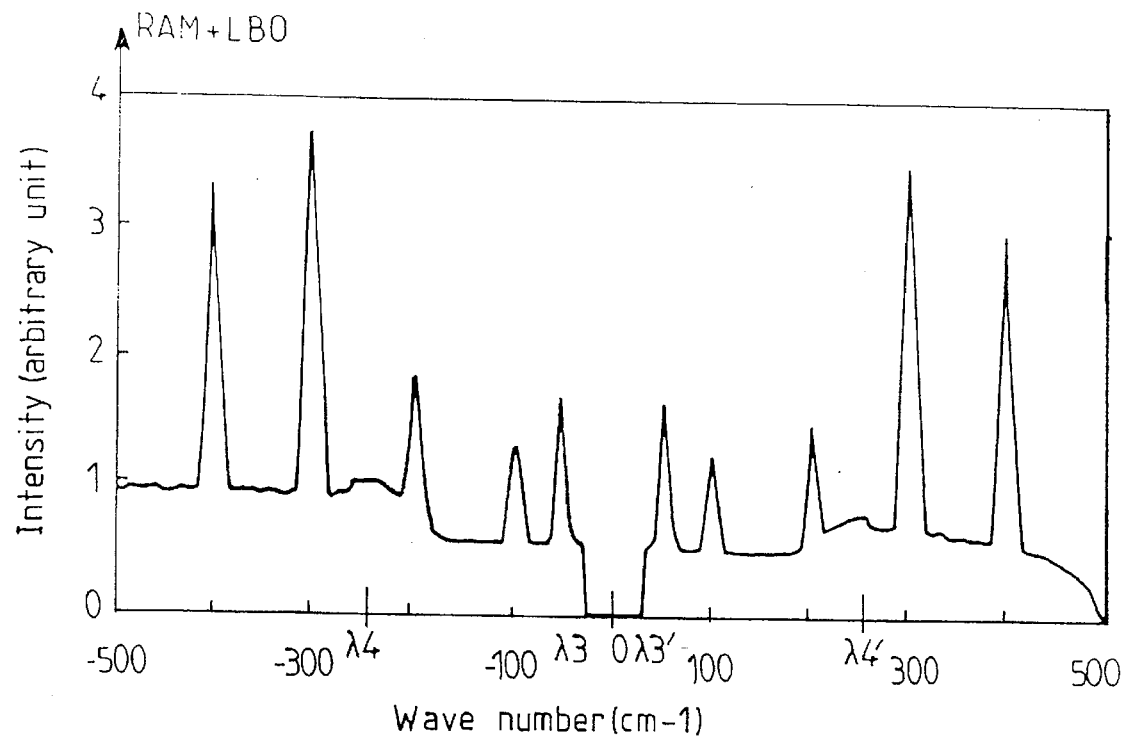
FIG. 15 shows the combination according to the invention of the RAMAN spectrum transmitted by a conventional separator filter and of the signal from the band-eliminating filter with a steep eliminating slope.

FIG. 15 shows the spectrum resulting from the combination of the signal RAM transmitted by the filter FS1 with the signal LBO coming from the band-eliminating filter FCB.

It is noted that this reconstituted spectrum LBO+RAM comprises all the useful data characteristic of the sample to be analyzed. With respect to the scattered radiation RD, it advantageously comprises all the data, except the excitation line of very high intensity which impedes detection and analysis.

Thus, with such a reconstituted signal, the analysis means are able to reach data which hitherto were lost.

In FIG. 2A, the band-eliminating filter FCB comprises a double subtractive monochromator having two diffraction gratings and a reflection/transmission light trap, interposed between the two gratings, similar to the one described in patent application FR-A-2 681 941 filed in the applicants' name. If necessary, the description of this application can be included in that of the present invention.

In short, the light source LA generates the excitation line REX. Optical means LO focus the excitation line REX on the transmission surface T10 of a reflection/transmission light trap PG10 which is to transmit this excitation line REX to a first dispersing stage R10. Generally, the optical system comprises the sample to be analyzed disposed at the location EMP, a lens such as, for example, a microscope lens L1, a reflective mirror M1, a further lens L2, an inlet slit FE, a concave collimator mirror M10, a diffraction grating R10 and a further concave mirror M20.

In the advance direction of the optical path (i.e. in the direction shown by the arrow F1), the monochromatic excitation line REX passes through the transmission surface T10, is reflected by the mirror M20 onto the diffraction grating R10 which diffracts it towards the mirror M10 so that it is guided onto the sample via the inlet slit FE, the lens L2, the mirror M1, the separator filter FS1 and the lens L1.

In the return direction of the optical path (i.e. in the direction shown by the arrow F2), the beam RD coming from the sample excited in this way by the excitation line REX is guided onto the separator filter FS1 which reflects the spectral band TLB via the mirror M1 to the first diffraction grating R10 described above. The diffraction grating R10 disperses the polychromatic radiation constituting the signal TLB. This radiation is focused by the mirror M20 so as to form a spectral image dispersed in the plane common to the reflective surfaces T30 and T20. The transmission surface T10 thus acts as a light trap for the excitation line present in the signal TLB by allowing it to pass through the surface T10 whilst the reflective surfaces T20 and T30 reflect the beam LBO, from which the excitation line REX has thus been eliminated, towards the concave mirror M30. The mirror M30 then guides the beam LBO to a second diffraction grating R20, a further concave mirror M40, an outlet slit FS and a lens L3. The diffraction gratings R10 and R20 are here arranged in a subtractive configuration, i.e. the radiation dispersed by the grating R10 and reflected by the reflective surfaces T20 and T30 is reconstituted to form a single image, with zero dispersion, on the outlet slit FS.

Optical combination means are provided for collecting and guiding the signal LBO filtered by the optical assembly comprising the double monochromator R10/R20 and the light trap PG10. These optical combination means comprise a mirror M2 which guides the signal LBO onto the separator filter FS1 in a direction DR1 forming an angle α with the transmission direction DT2. The separator filter FS1 then reflects the signal LBO exactly in the second transmission direction DT2, which permits complementary combination with the spectrum RAM transmitted by the separator filter. Via a lens L4 the analysis means MAY finally analyze the radiation LBO and RAM combined in this way.

For example, the detection and analysis means MAY comprise a FOURIER transform RAMAN spectrometer.

It should be noted that the device described with reference to FIG. 2A substantially increases the performance of a Fourier transform RAMAN spectrometer in so far as it permits access to the entire spectral range necessary for RAMAN spectrometry, including the region of low-frequency lines which hitherto were not accessible with a conventional notch-type separator filter.

It should also be noted that the light trap PG10, interposed between the two diffraction gratings R10 and R20 of the double monochromator, plays an additional role in that it allows the excitation line to pass, in the advance direction of the optical path, towards the sample and, in the return direction of the optical path, traps the excitation line present in the signal TLB reflected by the separator filter.

In a variant (FIG. 2B), the optical assembly R10/R20/PG10 can be produced by using lenses in place of the concave reflective mirrors which have the disadvantage of being bulky.

In short, the light source LA generates the exiting line REX. Optical means LO focus the excitation line REX near the bevelled edge of a mirror MB, here acting as a slit lip. The lens L12 transmits this excitation line REX towards a first dispersing stage R10. The optical system here comprises the sample to be analyzed disposed at the location EMP, a lens L1, such as for example a microscope lens, a reflective mirror M1, a further lens L2, an inlet slit FE, two further reflective mirrors MR2 and MR1, a lens L10 and a diffraction grating R10.

In the advance direction of the optical path (i.e. in the direction shown by the arrow F1), the excitation line REX is collimated into a parallel beam by the means L0 and L12 on the diffraction grating R10 which diffracts it towards the mirror MR1 so that it is guided onto the sample via the lens L10, the mirror MR2, the inlet slit FE, the lens L2, the mirror M1, the separator filter FS1 and the lens L1.

In the return direction of the optical path (i.e. in the direction shown by the arrow F2), the beam RD coming from the sample excited in this way by the excitation line REX is guided onto the separator filter FS1 which reflects the first spectral band TLB via the mirror M1 towards the first dispersing stage described above. The diffraction grating R10 disperses the polychromatic radiation constituting the signal TLB. This radiation is focused by the lens L12 to form a spectral image in the focal plane of the bevelled light trap MB. This light trap allows the line REX to pass whilst the reflective surface of the bevelled mirror MB reflects the beam LBO, from which the excitation line REX has been eliminated, towards a second dispersing stage which comprises a lens L13, a second diffraction grating R20, a further lens L14, a further reflective mirror MR3, and an outlet slit FS.

Evidently, the diffraction gratings R10 and R20 are mounted such that they are rotatably adjustable so that the position of the spectral image relative to the bevelled mirror can be regulated precisely, in order that the spectrum can be divided in the vicinity of the excitation wavelength.

Optical combination means M2 and L16 are provided to collect the signal LBO filtered by the double monochromator R10/R20 and the light trap MB and guide it onto the separator filter FS1 in a direction DR1 forming an angle α with the direction DT2.

The separator filter FS1 finally reflects the signal LBO in the direction DT2, which permits complementary combination with the spectrum RAM transmitted by the separator filter. Advantageously, via a lens L4, the analysis means MAY analyze the radiation LBO and RAM combined in this manner.

It should be noted that the device described with reference to FIG. 2B also substantially increases the performance of a Fourier transform RAMAN spectrometer or a mono or multichannel detection dispersal-type RAMAN spectrometer.

In FIG. 3, the optical path relative to the signal LBO is slightly modified with respect to the optical path described with reference to FIGS. 1, 2A and 2B. In this case, the optical radiation combination means further comprise a second separator filter FS2 disposed in a suitable manner downstream of the mirror M2 in order to reflect the signal LBO in the direction DT2 so that it is combined with the signal RAM transmitted by the filter FS1.

Figure 4:
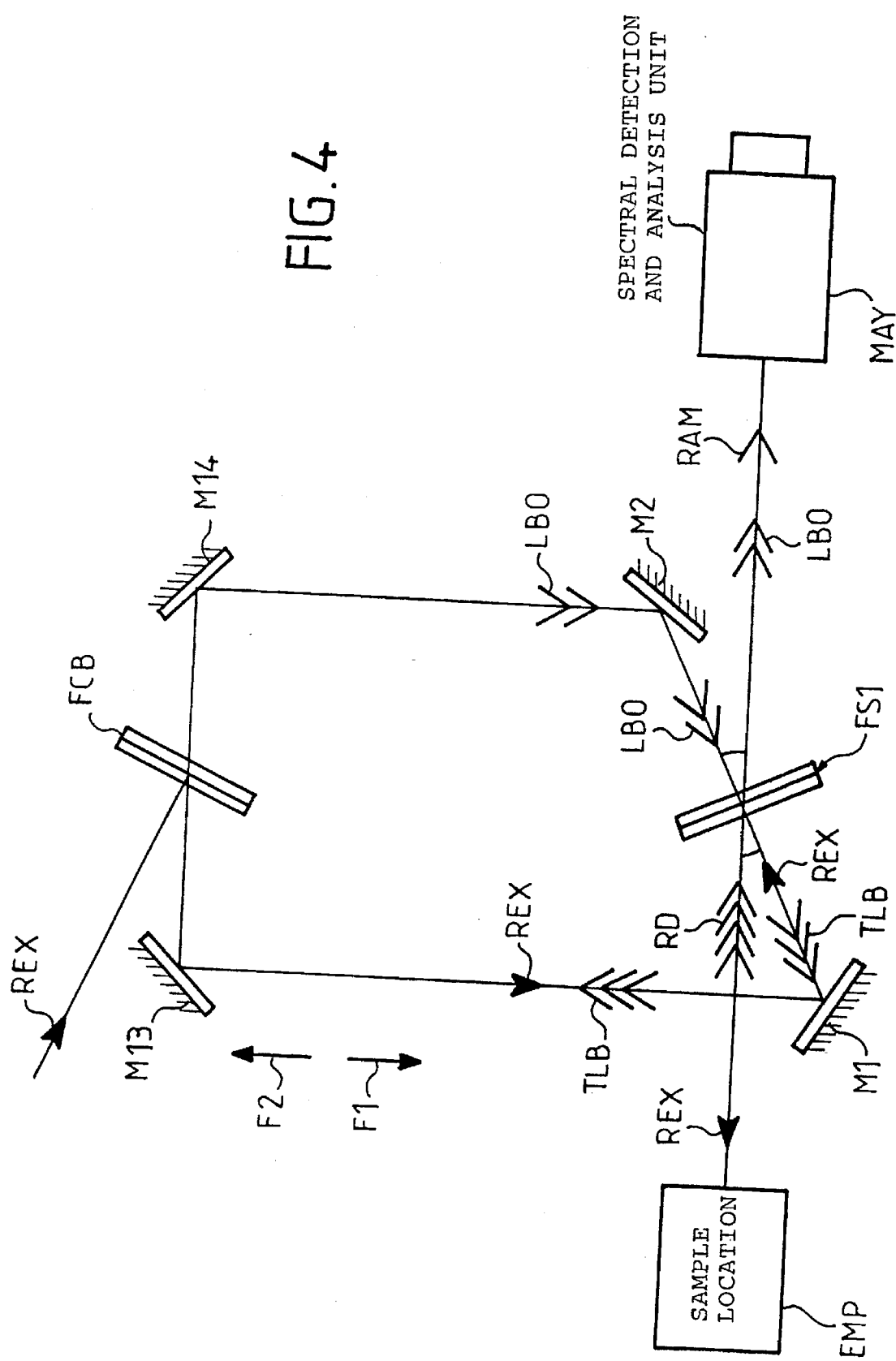
FIG. 4 is a combined complementary filtering spectrum analysis device according to the invention in which the band-eliminating filter with a steep elimination slope is of the interference or holographic type.

In FIG. 4, the band-eliminating filter FCB with a steep elimination slope is of the FABRY PEROT interferometer type.

The usual disadvantage of this type of filter is the existence of a large number of narrow transmission bands, which are equidistant in terms of number of waves and located in the spectral region covered by the RAMAN spectrum. Unexpectedly, this disadvantage disappears in the device according to the invention in that one of these narrow bands is made to coincide with the excitation radiation, inside the rejection band of the separator filter, bringing about the complementary filtering described above.

The filter FCB is disposed on the path of the excitation radiation (in the direction shown by the arrow F1). Firstly, it reflects, in a suitable direction, the excitation radiation REX towards a mirror M13, in order to be guided via the mirror M1 onto the separator filter FS1.

In the other optical direction (i.e. in the direction shown by the arrow F2), the band-eliminating filter FCB receives the signal which is representative of the spectral band TLB reflected by the separator filter FS1 via the mirrors M1 and M13. The band-eliminating filter FCB then eliminates the excitation line REX by reflection and transmits the signal LBO towards the mirrors M14 and M2 in order to guide it finally towards the detection means MAY via the filter FS1.

Figure 5:
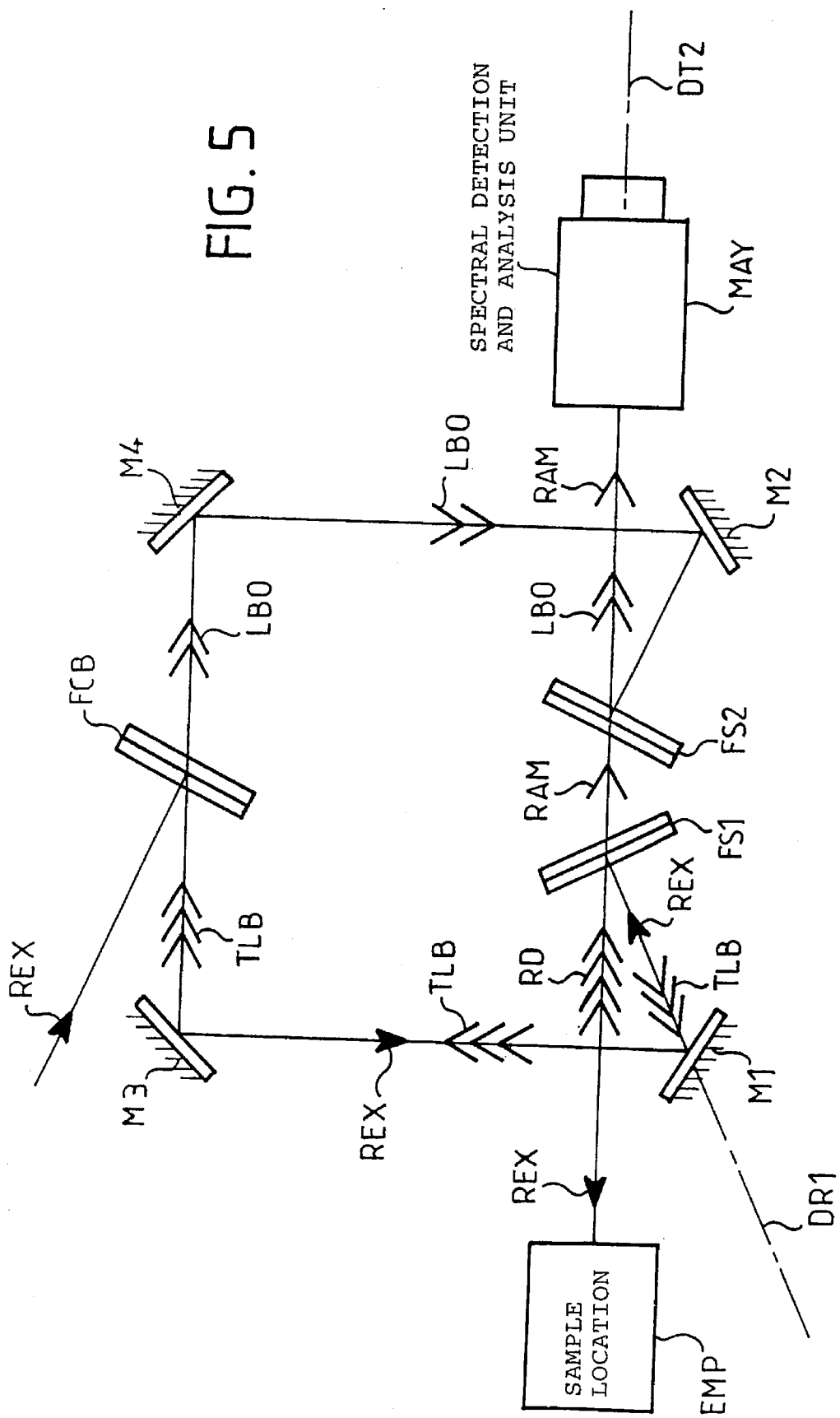
FIG. 5 describes the device of FIG. 4 using two standard separator filters according to the invention.

FIG. 5 shows a further variant of the combined complementary filtering spectrum analysis device according to the invention. This variant differs from the device described in FIG. 4 in that the optical combination means here comprise, instead of the assembly M2/FS1, an assembly M2/FS2 in which the element FS2 is a separator filter similar to the filter FS1. The assembly M2/FS2 is arranged such that it deflects the signal LBO in the direction DT2 towards the detection means MAY.

It should be noted that a different angular adjustment of the separator filters FS1 and FS2 offers a greater possibility for optimising the band-eliminating slope in the region of the excitation wavelength to be eliminated.

Figure 6:
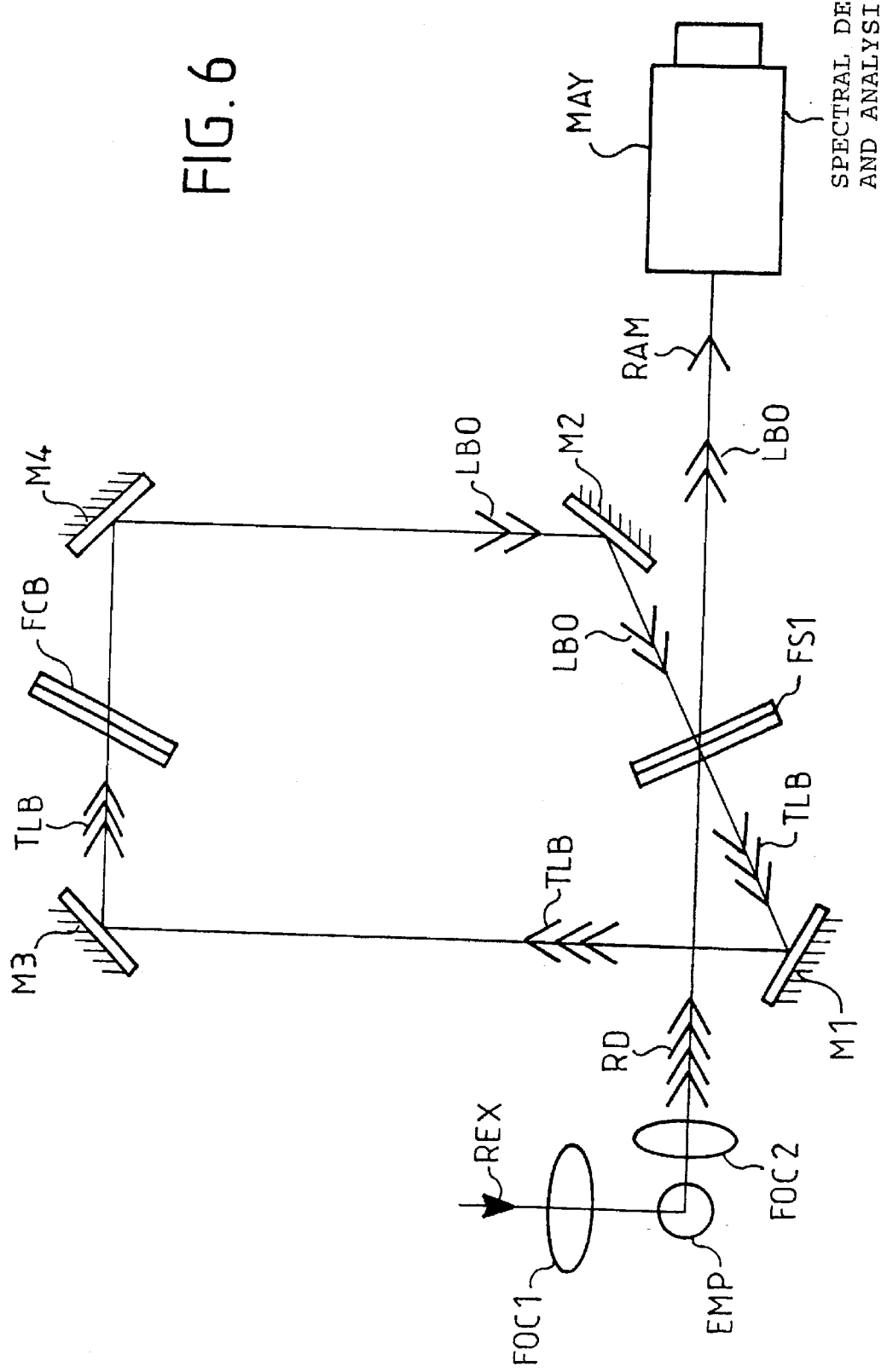
FIG. 6 shows schematically a combined complementary filtering spectrum analysis device according to the invention in which the excitation beam having the wavelength $\lambda 0$ is guided directly towards the sample without passing via the separator filter.

In FIG. 6, the optical path relative to the excitation radiation REX is slightly modified with respect to the devices described above. Here, the excitation radiation REX illuminates the sample disposed in the location EMP through focusing means FOC1 without passing via the separator filter FS1. This arrangement, for example at 90° to the optical collection axis, helps to eliminate the specular reflection on the sample and enables the intensity of the excitation line to be increased. This arrangement is only possible when the frontal distance from the lens FOC2 is more than a few millimeters.

In this case, the lens FOC2 is disposed between the location EMP and the filter FS1 in order to transmit a beam, with a small width, of the scattered radiation RD onto the filter FS1. In other respects, the optical paths are similar to the devices described above. The band-eliminating filter is, for example, an absorption-type filter of which the spectral response is described with reference to FIG. 16.

Figure 16:
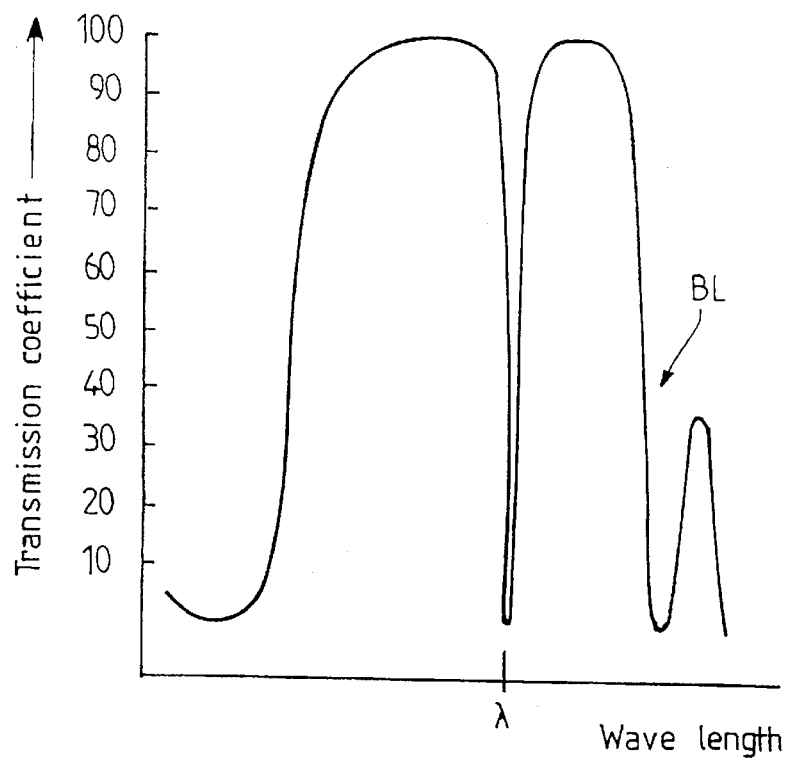
FIG. 16 shows the typical response curve of a conventional absorption-type band-eliminating filter with a steep eliminating slope.

In FIG. 16, the absorption filter eliminates a narrow band with a steep elimination slope centred on the wavelength λ0 (low transmission coefficient) as well as other bands BL offset relative to λ0. Unexpectedly, this is not disadvantageous in so far as these other bands are located outside the rejection band of the separator filter FS1. The result is that the combination of complementary filtering re-establishes the integrity of the entire RAMAN spectrum. The filter FCB is of the iodine vapour absorption type, for example.

Figure 7:
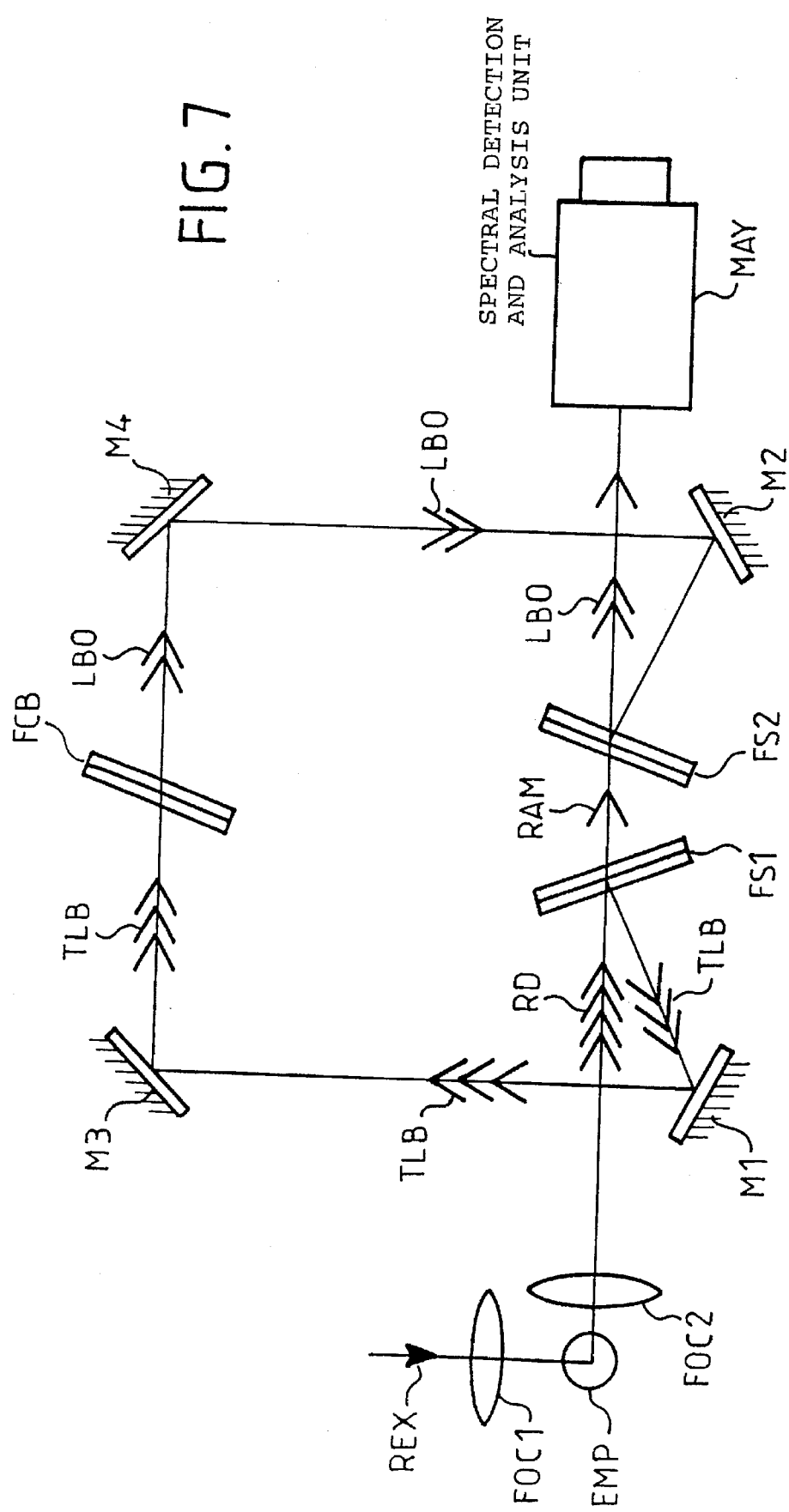
FIG. 7 shows schematically the combined complementary filtering spectrum analysis device described in FIG. 6, using two separator filters arranged in series.

FIG. 7 shows the combined complementary filtering spectrum analysis device described with reference to FIG. 6 with, in addition, the variant relating to the second separator filter FS2 disposed in accordance with FIG. 3.

Figure 8:
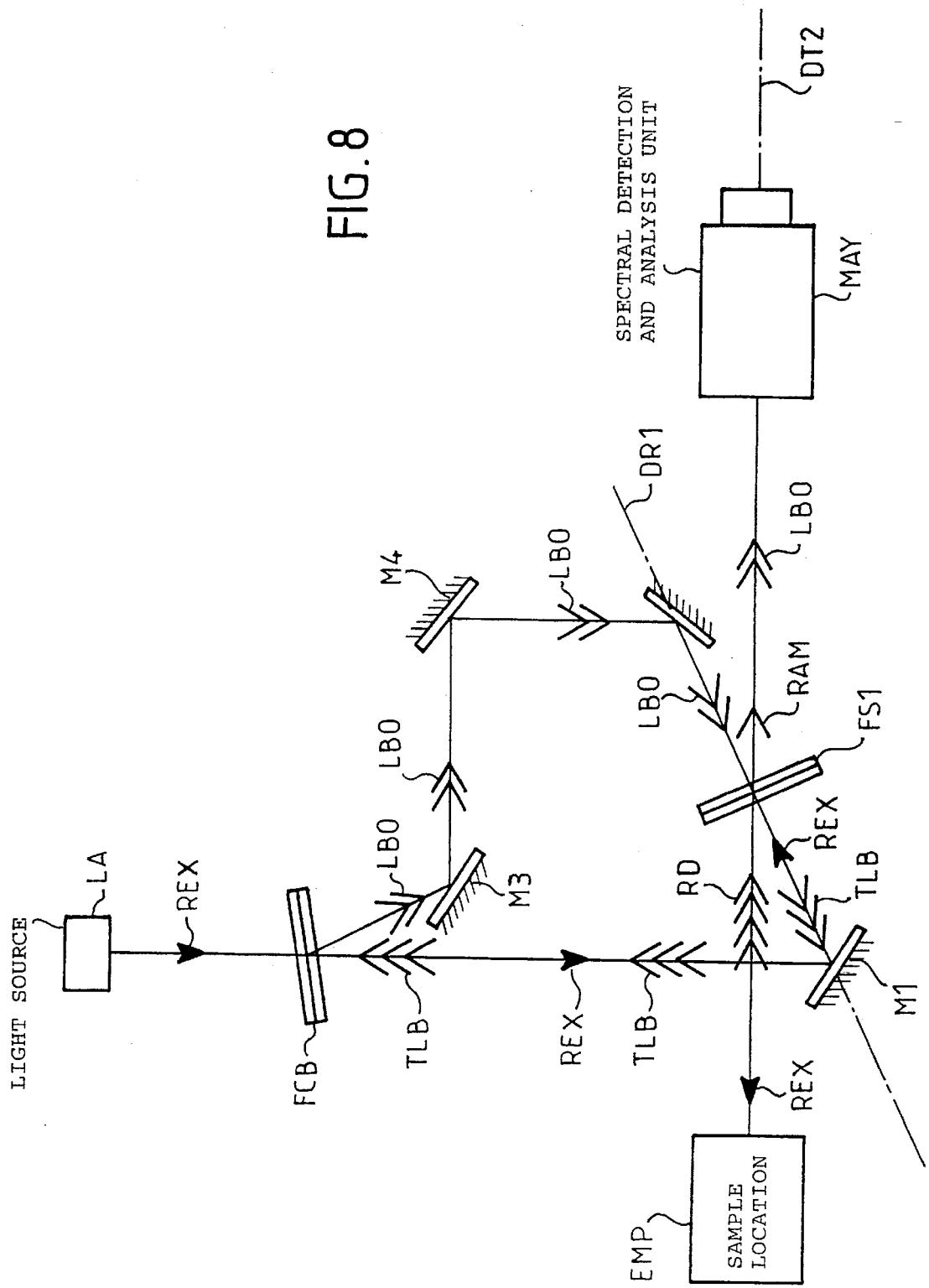
FIG. 8 shows schematically a combined complementary filtering spectrum analysis device according to the invention in which the band-eliminating filter with a steep elimination slope is of the FABRY PEROT reflection interferometer type.

FIG. 8 shows a further variant of the device according to the invention in which the band-eliminating filter is of the interferometer type with a spectral response described with reference to FIG. 17.

Figure 17:
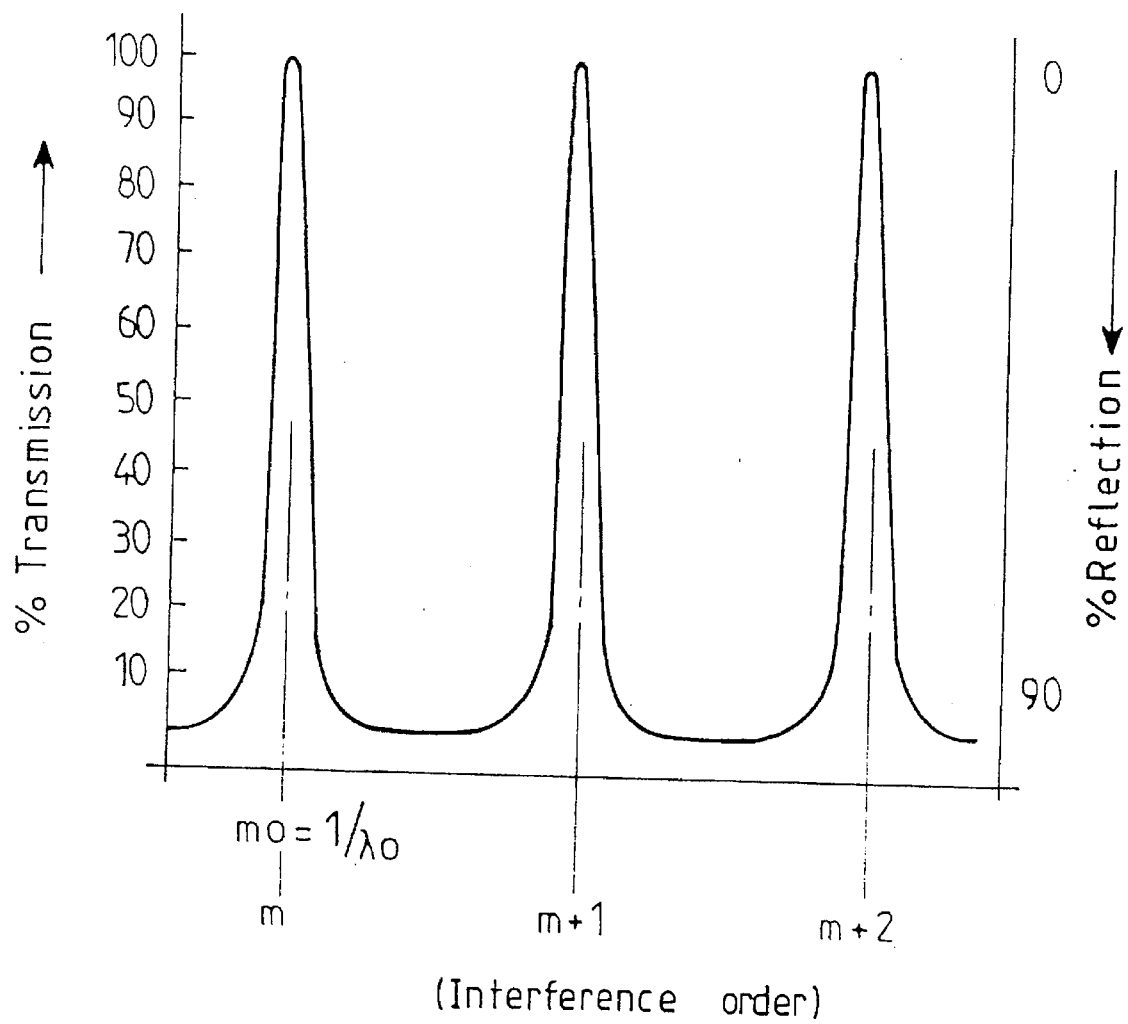
FIG. 17 shows schematically the typical response curve of a conventional FABRY PEROT interferometer-type band-eliminating filter with a steep eliminating slope.

In FIG. 17, the FABRY PEROT-type interferometer filter has a large number of narrow transmission peaks equidistant in terms of the number of waves. For a single one of these peaks, the maximum transmission attenuation is centred on the number of waves of the excitation radiation to be eliminated.

The separator filter FS1 described above can be mounted such that it pivots about an axis of rotation, so as to vary the angle α which the incidence direction DT2 makes relative to the reflection direction DR1 in order to select the wavelength of the elimination band of said separator filter. However, this rotation brings about a displacement in space of the reflected signal TLB, which may complicate the coupling of the optical elements located upstream or downstream of the filter FS1.

The present invention proposes a solution to this problem, which entails interposing either on the inlet beam RD or on the outlet beam TLB a deviation-compensating component M1 which can be entrained by a mechanism associated with the rotation of the separator filter FS1, such that the compensator component rotates at the same angle as that of the separator filter in order to reflect the first spectral band TLB in the third predetermined direction DR3.

In practice, the deviation-compensating component is a flat mirror which, when the separator filter FS1 rotates at a predetermined angle, rotates by the same angle owing to the mechanism according to the invention.

More precisely, the mechanism displaces the point of incidence of the beam TLB on the deviation-compensating component M1 in translation along the output axis DR3.

The angle-compensating or self-alignment mechanism of the inlet and outlet beams can be arranged in a plurality of configurations. In the rest of the description, these configurations are articulated about a bracket bearing the separator filter on one of its legs and the compensator component on its other leg. However, other configurations may be suitable.

Figure 18A:
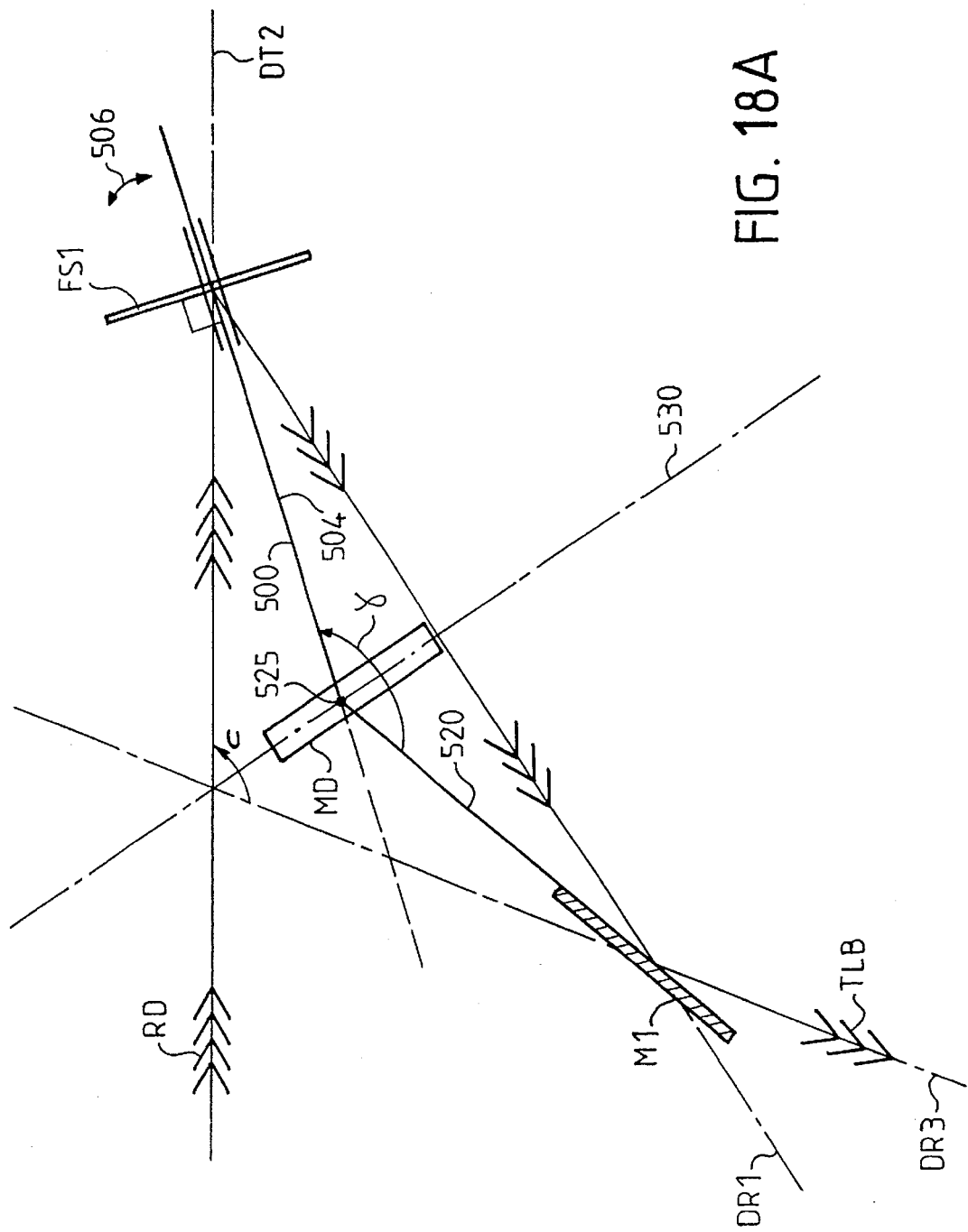

With reference to FIG. 18A, the inlet radiation RD and output radiation TLB are disposed in any respective directions DT2 and DR2 forming an angle C relative to each other.

The angle-compensating or self-alignment mechanism according to the invention comprises a bracket which has an angle γ in which γ=(180+C)°/2. The bracket has a first rigid leg 504 mounted such that it slides in translation through an aperture in the support of the separator filter FS1 and a second rigid leg 520 bearing the compensator component M1.

The apex of the bracket 525 is subject to displacement in translation along an axis 530 disposed at a bisecting angle between the incidence direction DT2 and the third direction DR3.

The first rigid leg remains perpendicular to the separator filter FS1 whilst the latter rotates about the axis 506.

In FIGS. 18B to 23, the optical assemblies described concern a device in which the incidence direction DT2 and the output direction DR3 are parallel with each other.

According to the invention, the mechanism comprises a bracket 10 having an angle which is precisely 90° (in which C equals 0). The bracket has a first rigid leg 12 mounted such that it slides in translation through an aperture provided in the support of the separator filter FS1.

The compensator component M1 is mounted such that it is fixed on the second rigid leg 20 of the bracket 10. The reflective surface of the reflector component is parallel with the second leg and perpendicular to the plane P1 determined by the straight lines DT2 and DR3.

The apex S1 of the bracket is mounted on a pivot 21 of which the axis of rotation is perpendicular to the plane P1. The apex S1 of the bracket is subject to displacement on a slide 25 in rectilinear translation 22 of which the axis is located mid-way between the incidence direction DT2 and the third reflection direction DR3. This axis 22 is parallel with said incidence direction DT2 and reflection direction DR3 and is located in a plane parallel with that of the bracket.

The first rigid leg remains perpendicular to the separator filter FS1 as the latter rotates about the axis 14 perpendicular to the plane of the bracket and to the plane P1 determined by the straight lines DT2 and DR3. This axis of rotation 14 occupies a predetermined fixed position.

It should be noted that the legs of the bracket form with the beam reflected onto the separator filter FS1 a right angle bracket of which the angle at the apex is equal to α/2, i.e. it is constantly equal to half the angle α between the incident beam RD and the reflected beam TLB.

According to the invention, in response to a rotation of the filter FS1 by a predetermined angle (passage from FS1 to FS1' or from α to α'), the first and second legs 12 and 20 of the bracket 10 can be displaced in translation (passage from 10 to 10'), such that the reflector component M1 rotates (passage from M1 to M1') by said angle in order to receive the first spectral band TLB and reflect it in the third predetermined reflection direction DR3.

Advantageously, means MD for controlling displacement in translation and/or rotation can control the displacement of the movable components of the device in order to bring about the rotation of the compensator component M1 by an angle corresponding to that of the separator filter. These control means MD are, for example, a micromotor. These control means bring about self-alignment of the device as a function either of variations in the excitation wavelength or of variations in the characteristics of the filter FS1. This filter FS1 can advantageously be interchangeable in order to adapt the system to a plurality of excitation processes.

Figure 18B:
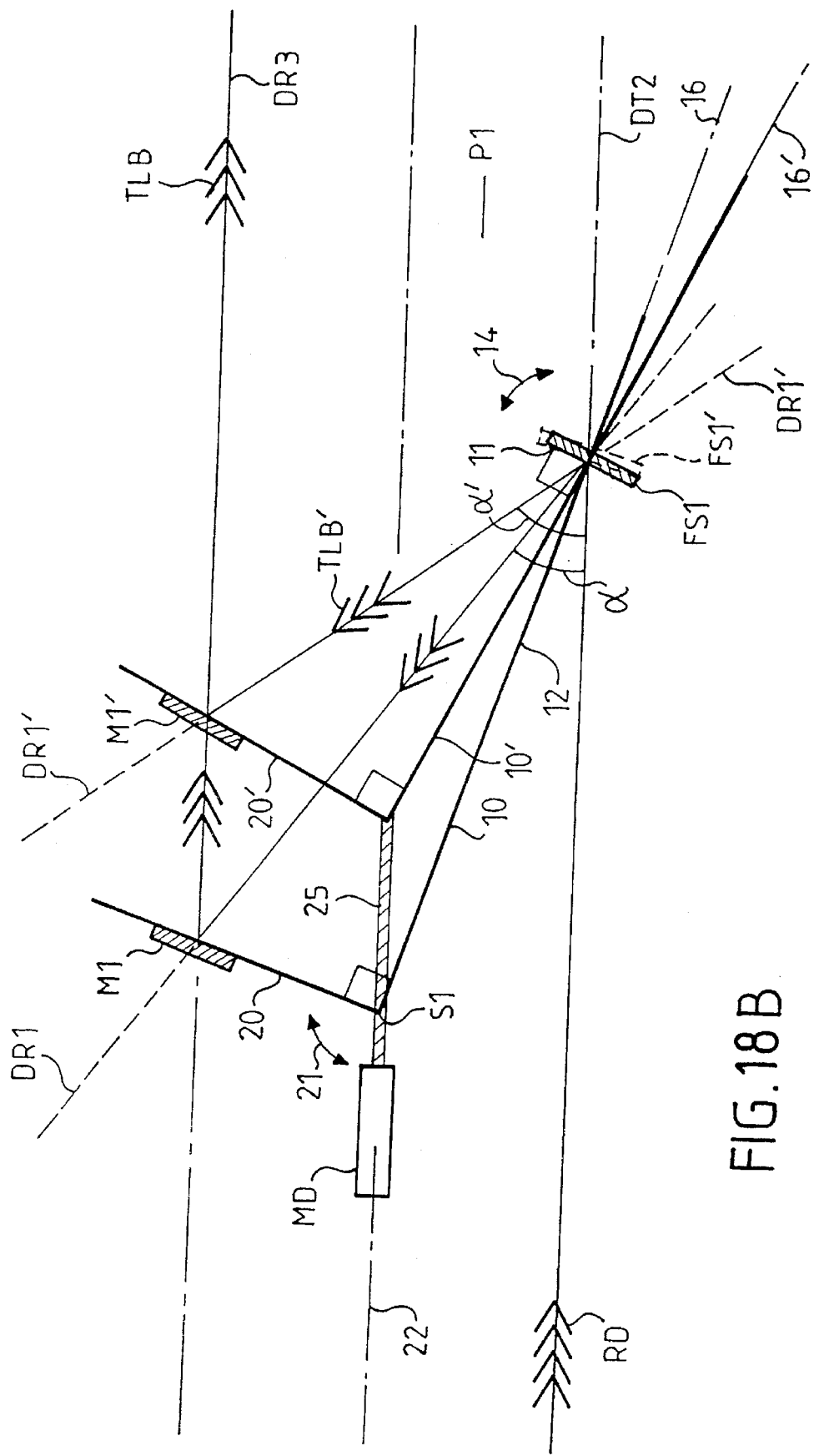
FIG. 18B shows schematically the self-alignment device according to the invention when the incidence direction DT2 and the output direction DR3 form any angle between themselves.

In FIG. 18B the scattered radiation RD emanates from the left-hand side, in the direction DT2, and is reflected via the components FS1 and M1 to the right-hand side, in the direction DR3.

Figure 19:
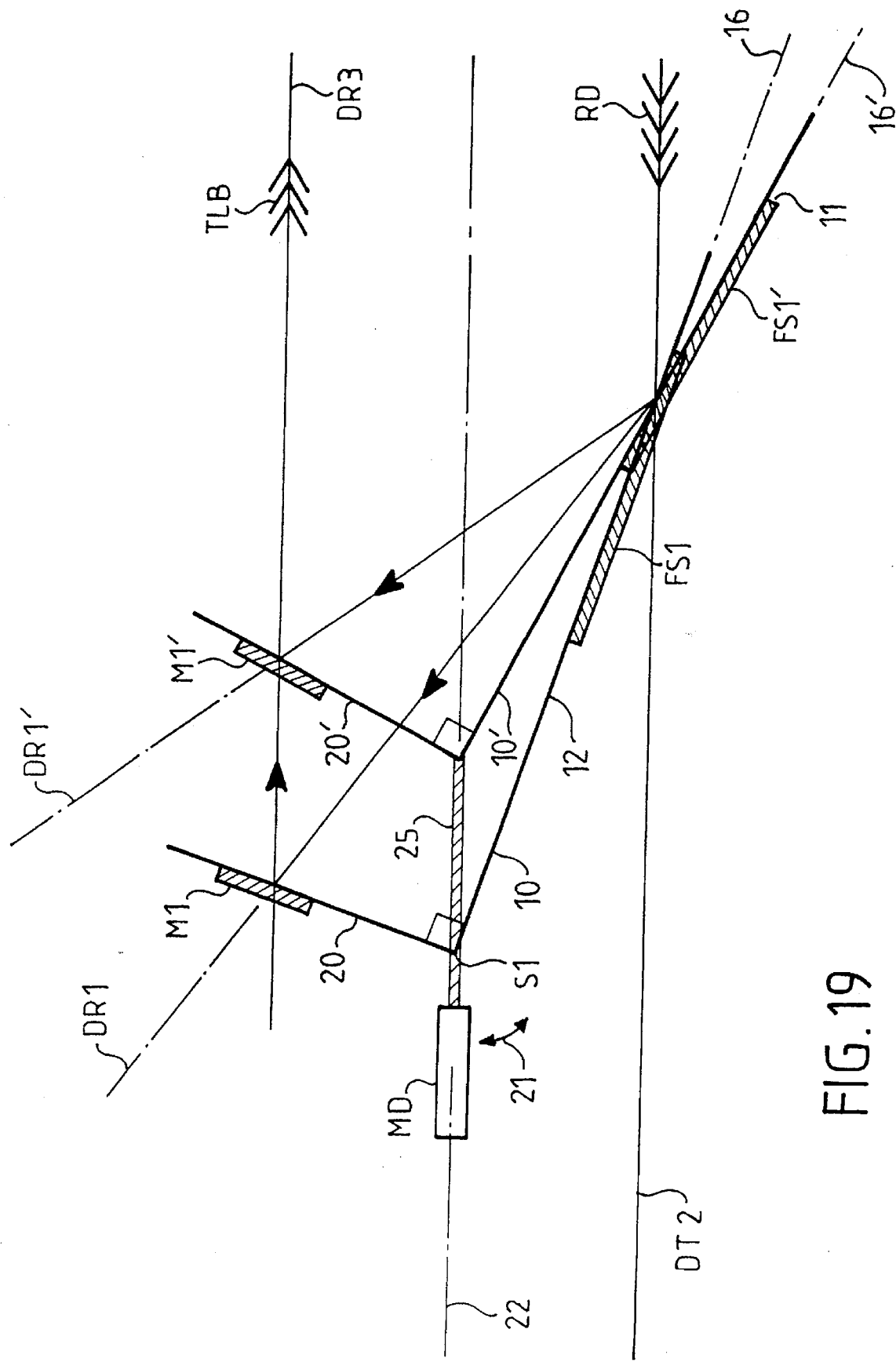

In FIG. 19, the optical assembly differs from that described with reference to FIG. 18 in that the beam corresponding to the scattered radiation RD emanates from the right-hand side and is guided onto the separator filter FS1. The signal TLB is reflected in the direction DR1 towards the compensator component M1 which reflects the signal TLB towards the right-hand side in the direction DR3. As described with reference to FIG. 18B, the second rigid leg remains parallel with the compensator component M1 during the translation of the apex of the bracket.

Figure 22:
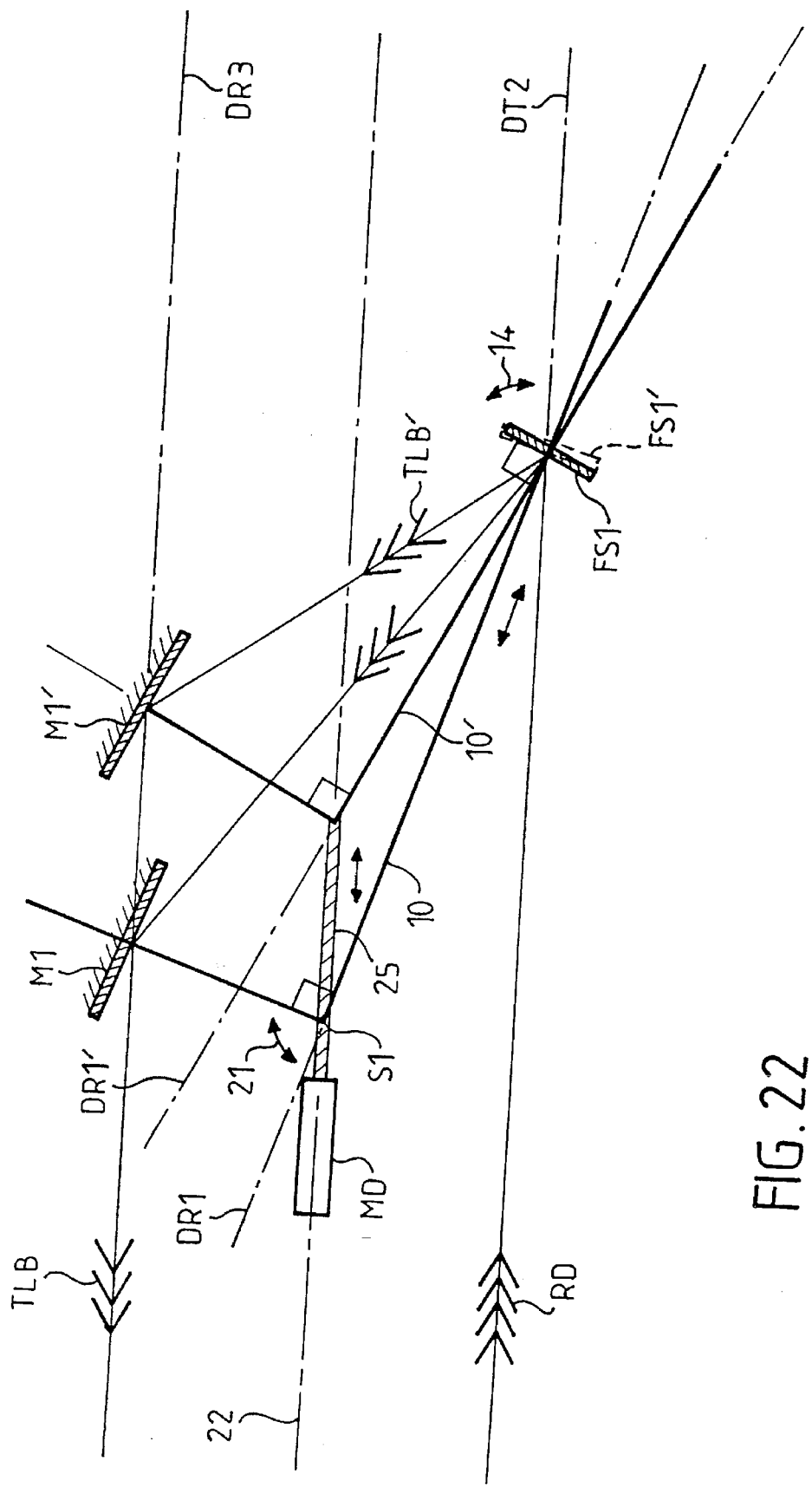

In FIG. 22 the scattered radiation RD emanates from the left-hand side, in the direction DT2. The signal TLB is likewise guided towards the left-hand side in the direction DR3 via the mirror M1. The second rigid leg 20 here remains perpendicular to the compensator component M1 during the translation of the apex of the bracket S1.

Figure 23:
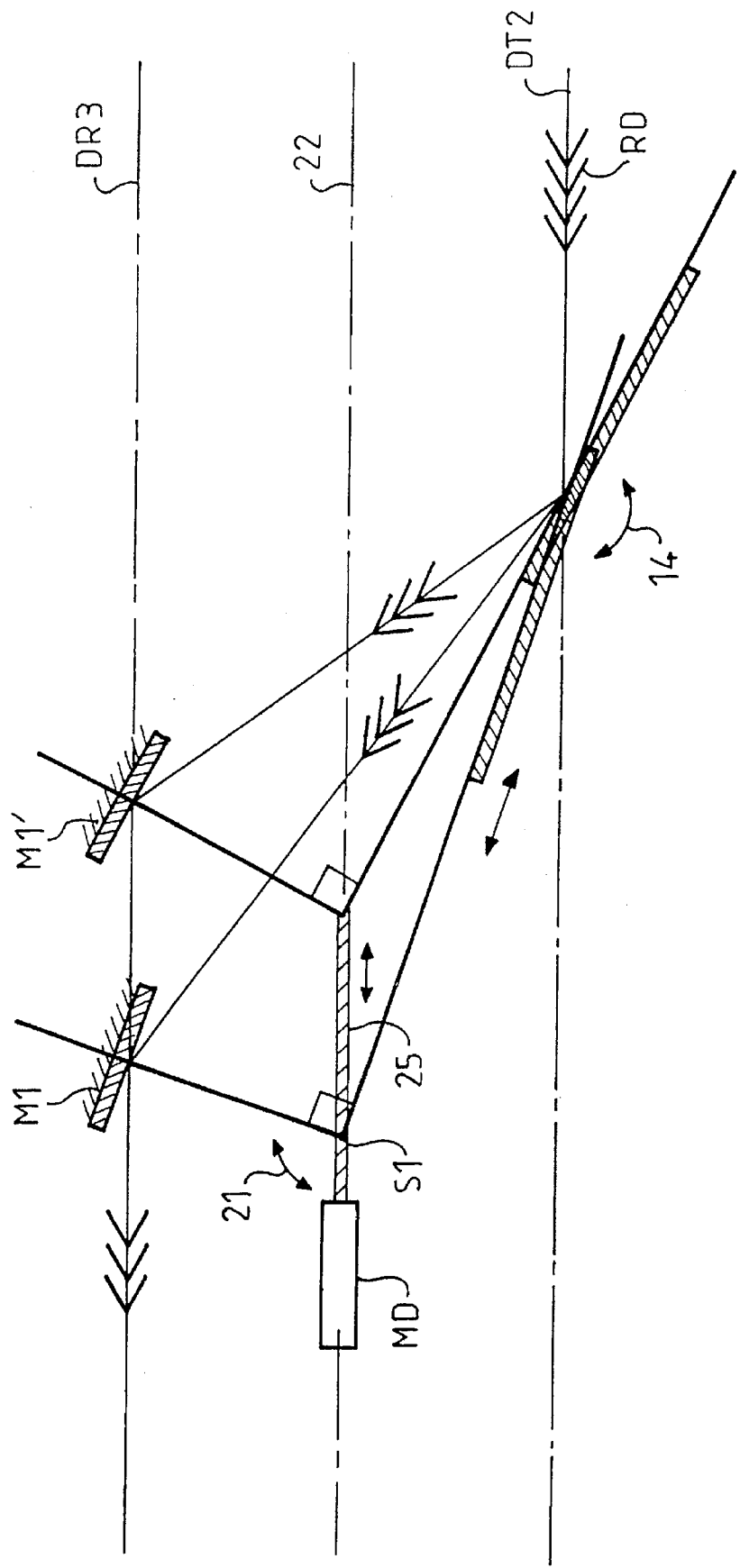

In FIG. 23, the scattered radiation RD emanates from the right-hand side and is guided onto the filter FS1, in the direction DT2. The signal TLB is reflected by the components FS1 and M1 and is guided towards the left-hand side in the direction DR3.

Figure 20:
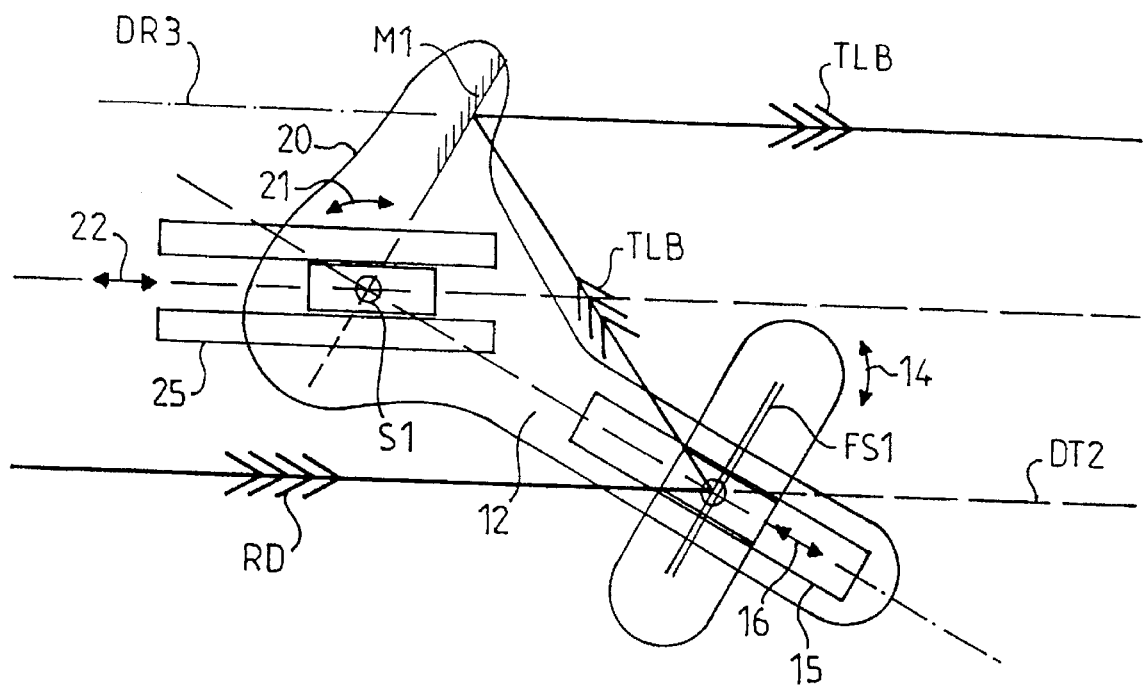

FIG. 20 shows an embodiment of the bracket 10 described with reference to FIGS. 18B, 19, 22 and 23. In this embodiment, the first leg 12 can be displaced in a first slide 15 along the first axis of translation 16, the filter FS1 remaining fixed in translation. The slide 15 is disposed in the vicinity of the separator filter FS1. The apex S1 of the bracket can be displaced in a second slide 25 along the second axis of translation 22. The slide 25 is articulated about the pivot 21.

Figure 21:
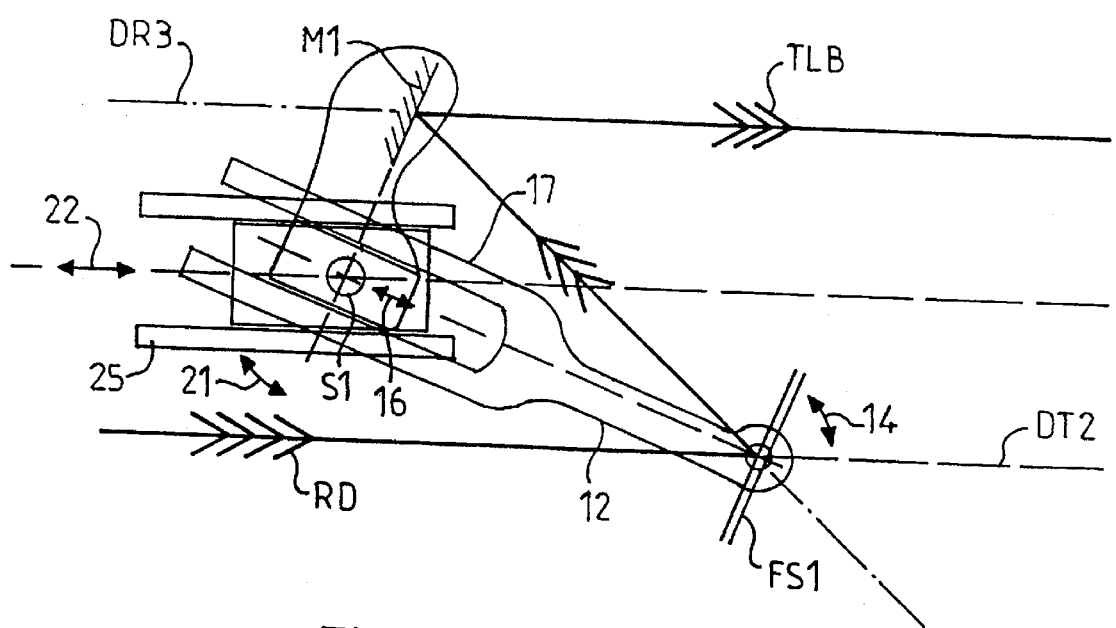

As a variant, according to FIG. 21, the first leg 12 can be displaced in a further slide 17 along the first axis of translation 16. In this arrangement, the slide 17 is articulated about the apex S1.

By virtue of the assemblies thus proposed according to the invention, the inlet beam RD and outlet beam TLB are fixed in space and are held aligned with the other components of the optical system when the separator filter pass-band is to be varied.

It should be noted that this principle can be extended to an assembly of a plurality of filters arranged in series on the optical path so that the spectral filtering characteristics are improved. Evidently, if an arrangement is desired in which the outlet beam TLB is not parallel with the inlet axis RD, an additional fixed mirror (not shown) can be added on the path of the outlet beam TLB, for example.

The beam angle-compensating or self-alignment mechanism can likewise be used in a device in which the directions DT2 and DR3 are perpendicular to each other.

In these conditions, the mechanism according to the invention comprises a bracket 100 having an angle γ which is precisely 135° (FIG. 24) (in which C is 90°).

According to a first embodiment, in which the axis of rotation of the filter FS1 is fixed in translation, only the compensation mirror M1 undergoes translation and simultaneously rotates by an angle α equal to the rotation of the filter FS1.

In practice, the bracket 100 comprises a first rigid leg 104 on which the separator filter FS1 is mounted so as to pivot about an axis of rotation 106 located in a plane perpendicular to that of the bracket. The first leg 104 is mounted so that it slides through the aperture in the support of the filter FS1, such that the first leg 104 remains perpendicular to the plane of the filter FS1 during the translation of the apex of the bracket.

The bracket 100 further comprises a second rigid leg 120 mounted so as to slide through the aperture in the support of the compensator component M1, so that the second leg remains perpendicular to the plane of the compensator component M1.

The apex S2 of the bracket 100 is integral with a pivot 121 of which the axis of rotation is perpendicular to the plane defined by the straight lines DT2 and DR3. The pivot 121 is mounted such that it slides along a predetermined axis of translation 130 disposed at 45° to the incidence direction DT2 and to the third reflection direction DR3, and located in a plane parallel with that of the bracket.

In response to a rotation of the first filter FS1 by a predetermined angle α, the apex S2 of the bracket can be displaced in translation such that the compensator component M1 rotates by said angle in order to receive the first spectral band TLB and reflect it in the third predetermined reflection direction DR3.

In practice, the axis of translation of the second leg is guided on a slide in the direction DR3.

It should be noted that in this arrangement, the mirror M1 is no longer parallel with the filter FS1 but is entrained by a rigid arm such that the angle is 135°. The angle between the straight line DT2 and the axis 130 here remains constant and is 45°.

Figure 24:
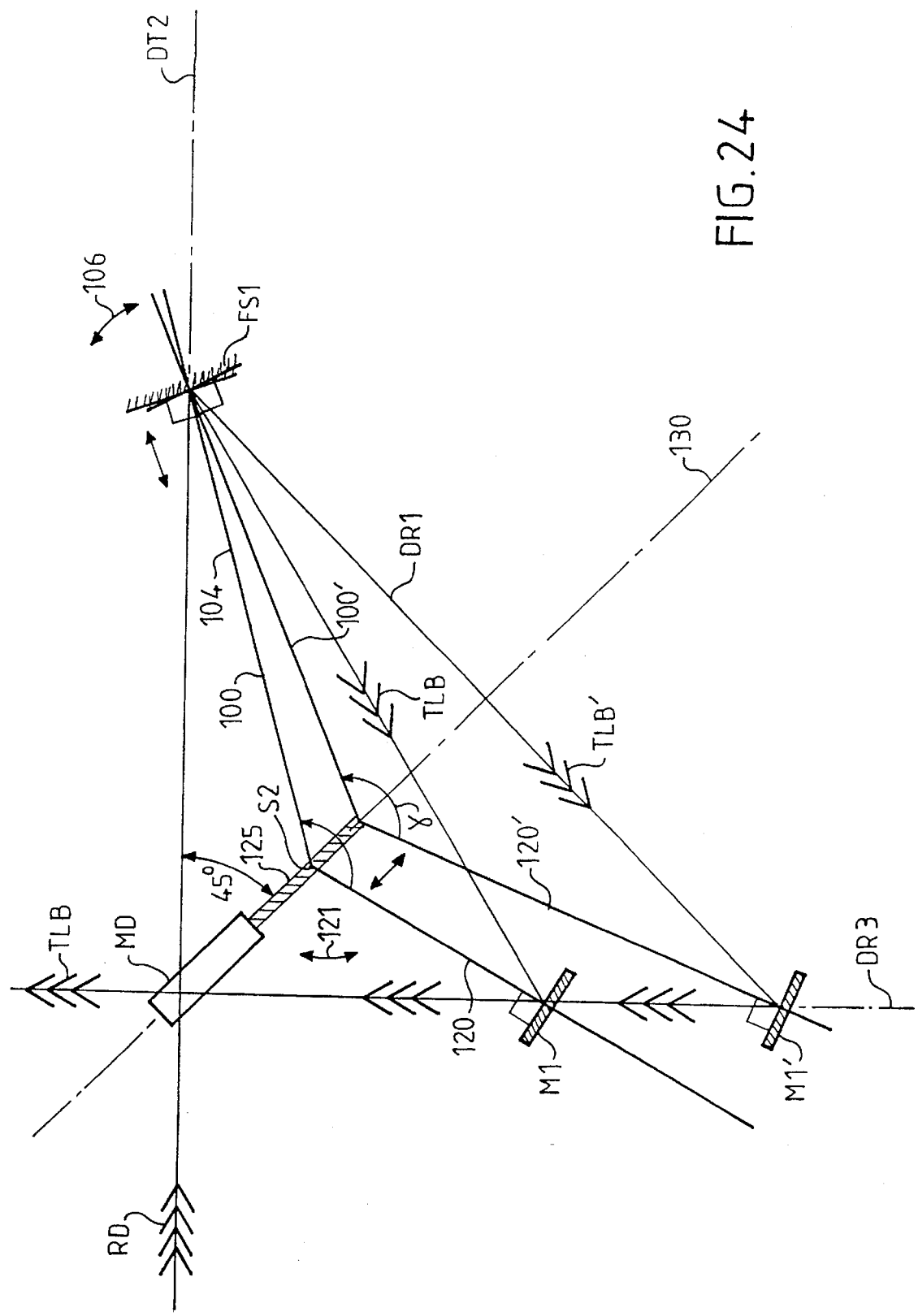
FIGS. 24 to 28 show schematically the self-alignment device according to the invention when the incidence direction DT2 and the output direction DR3 are perpendicular to each other.

In FIG. 24 the beam RD scattered by the sample emanates from the left-hand side and is guided in the direction DT2 onto the filter FS1. The separator filter FS1 separates the radiation RD into two beams, the first RAM is transmitted in the direction DT2 and the second, corresponding to the signal of the spectral band TLB, is reflected in the direction DR1 towards the flat mirror M1. The latter reflects the spectral band TLB in the direction DR3 perpendicular to the direction DT2.

In FIG. 24, the signal TLB is directed upwards in the direction DR3. In a variant (FIG. 25), the arrangement is adapted so as to guide the signal TLB downwards, in the direction DR3. The mirror M1 here is fixed parallel with the second leg 120 and no longer has a pivot or slide. The dimensions of the reflective surfaces of the filters FS1 and of the flat mirror M1 are adapted to permit self-alignment of the inlet beam RD and outlet beam TLB, according to the invention.

For example, the dimensions of the reflective surfaces are of the order of 20 to 30 mm for commercially available components.

Figure 25:
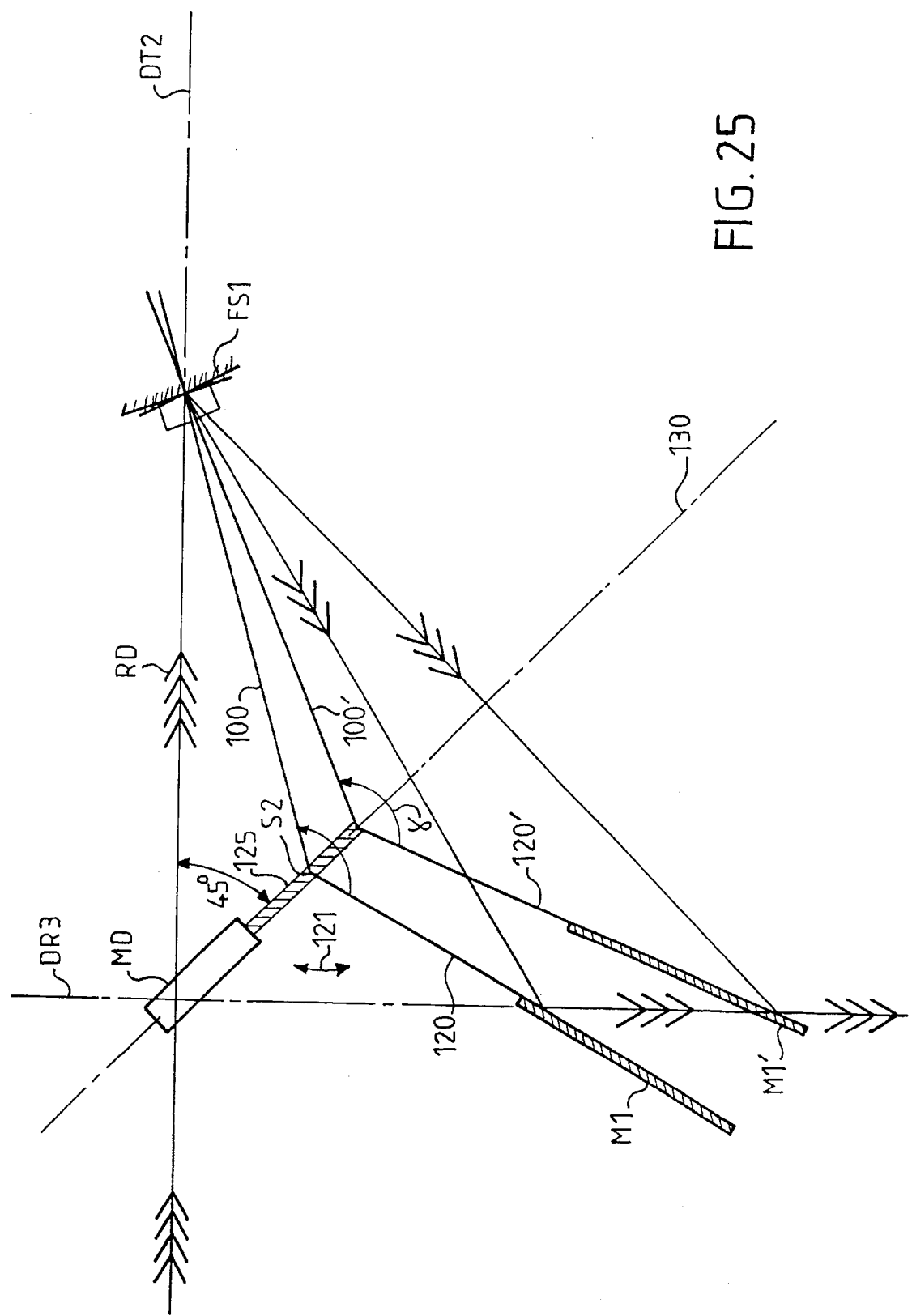
Figure 26:
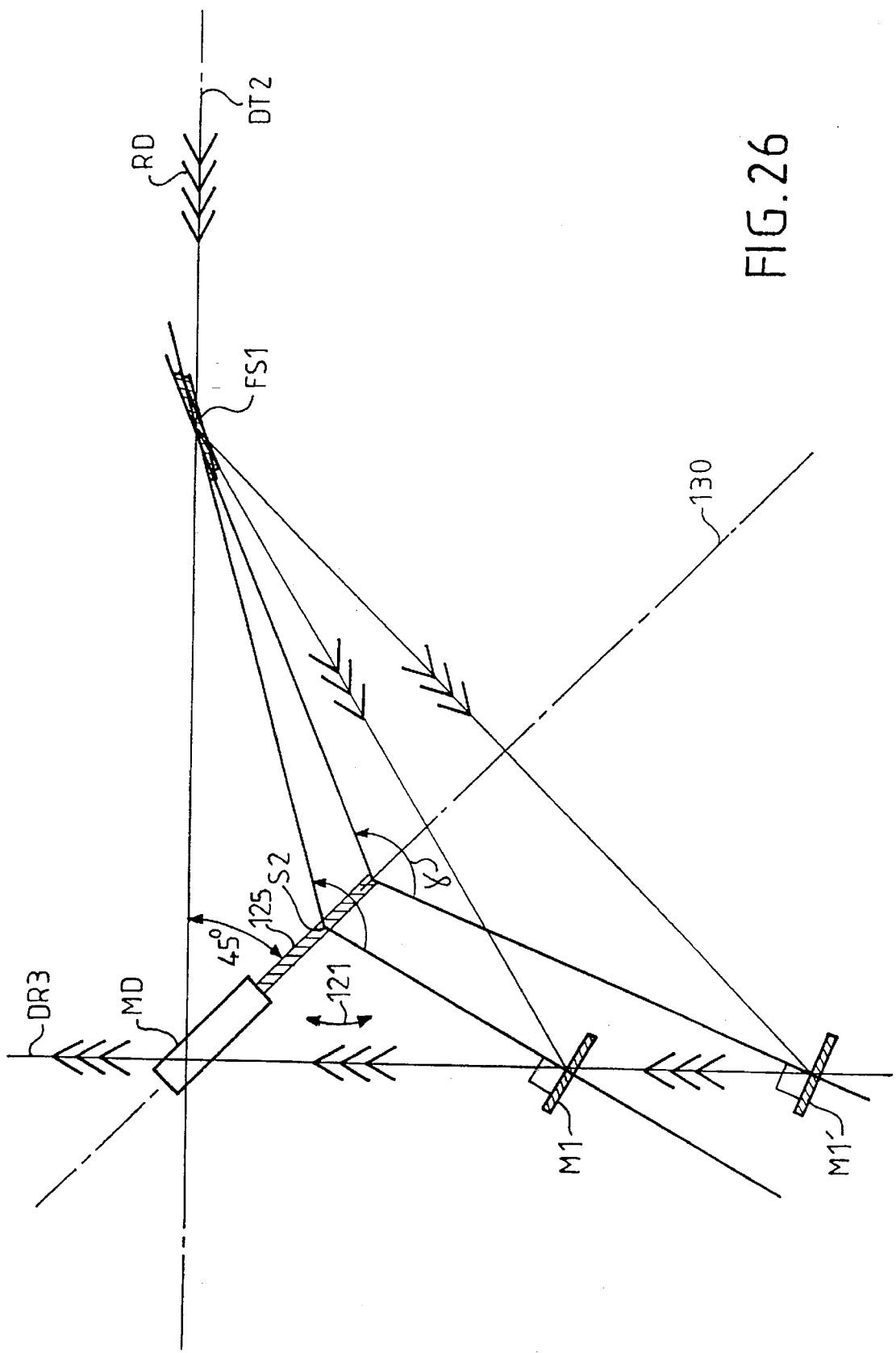

FIG. 26 shows a further variant in which the signal RD emanates from the right-hand side, instead of from the left-hand side in accordance with FIGS. 24 and 25.

In other respects, the arrangement described with reference to FIG. 26 is similar to the arrangement described with reference to FIG. 24.

Figure 27:
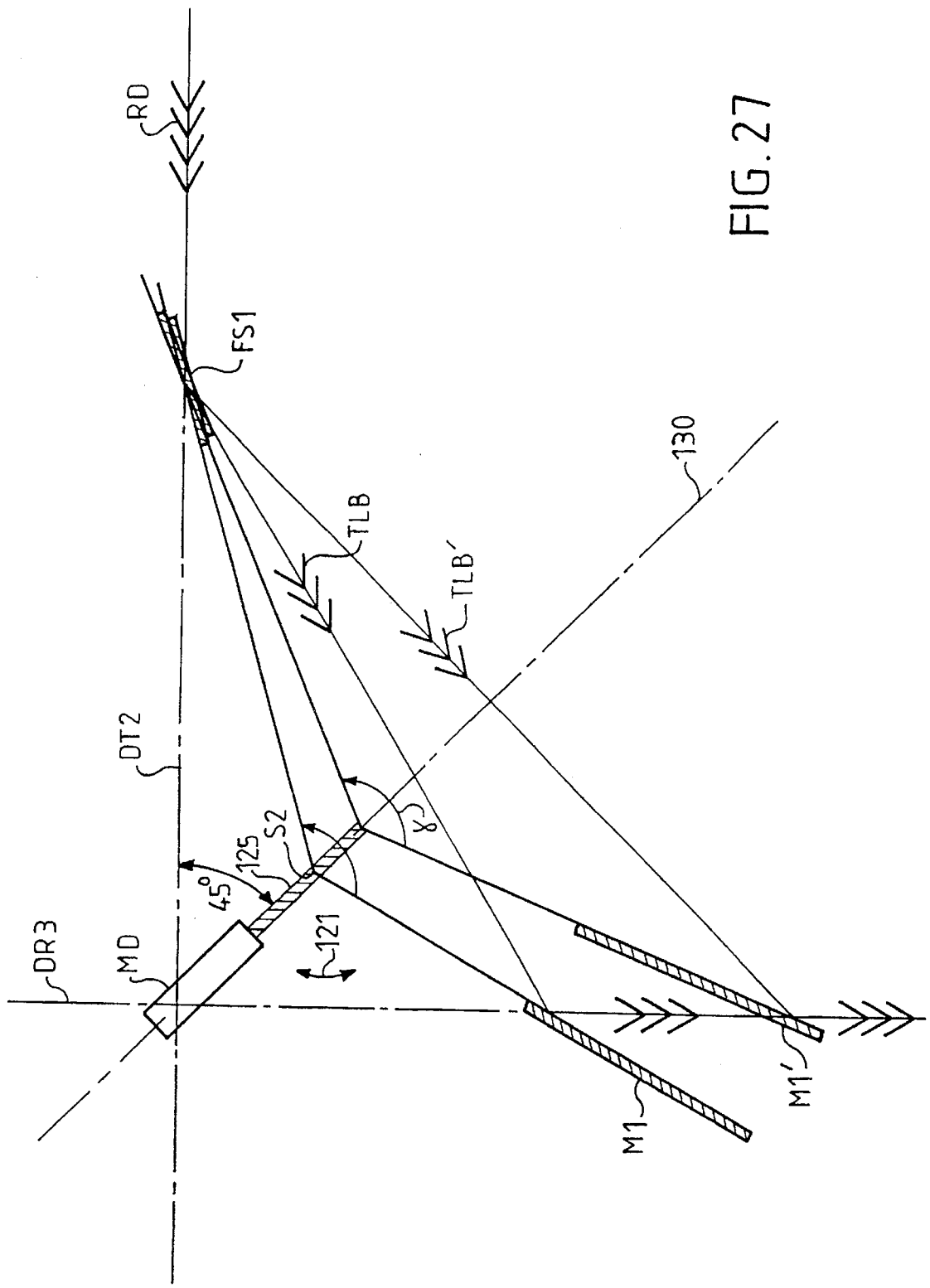

In FIG. 27, the scattered signal RD emanates from the right-hand side and is guided downwards, in the direction DR3.

Figure 28:
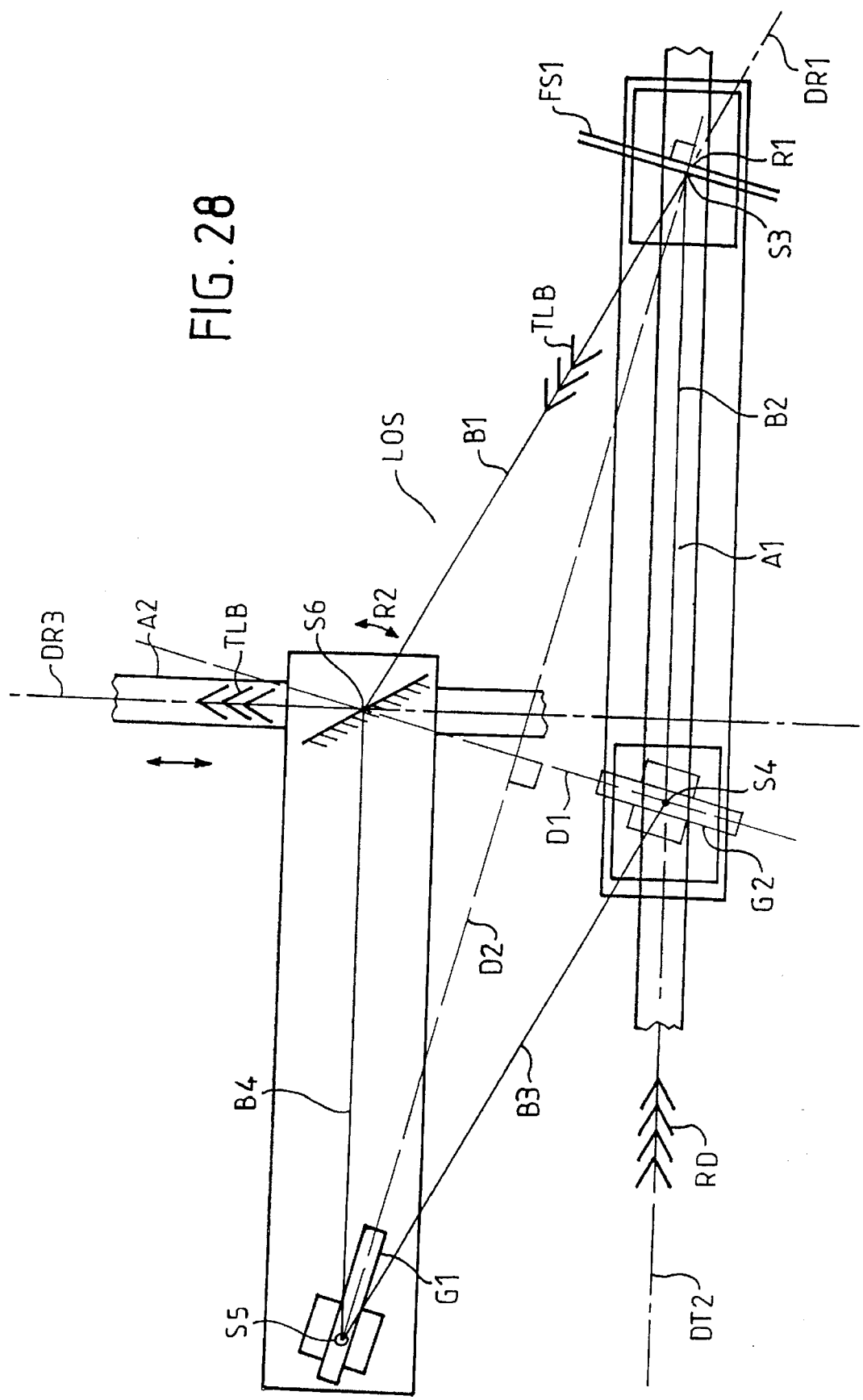

FIG. 28 shows a further variant in which the separator filter FS1 pivots and undergoes translation. Similarly, the compensation mirror M1 pivots and likewise undergoes translation.

In this arrangement, the self-alignment device according to the invention comprises four legs B1 to B4 of a given constant length so as to form a lozenge LOS having four apexes S3, S4, S5 and S6.

The apex S3 of the legs B1 and B2 supports the separator filter FS1. It pivots about an axis of rotation R1 disposed in a plane perpendicular to that of the legs B1 and B2.

The apex S6 of the legs B4 and B1 supports the mirror M1. It pivots about an axis of rotation R2 disposed in a plane perpendicular to the legs B4 and B1.

The apex S4 of the legs B2 and B3 supports a slide G2 which can guide the apex S4 in translation along a diagonal D1 of the lozenge LOS.

The apex S5 of the legs B3 and B4 supports a slide G1 which can guide the apex S5 in translation along a further diagonal D2 of the lozenge LOS.

The leg B2 is mounted so that it slides in translation along an axis A1 parallel with the direction DT2.

The leg B4 is mounted so that it slides in translation along an axis A2 parallel with the direction DR3.

A known property of the lozenge is that the diagonals remain perpendicular to one another when the angles at the apex are to be varied.

By simultaneously displacing the two slides G1 and G2, in response to a rotation of the filter FS1 by a predetermined angle, the compensation component M1 rotates by the same angle in order to receive the first spectral band TLB and reflect it in the third predetermined reflection direction DR3.

As a variant, in which the lozenge is replaced by a parallelogram, the diagonal, of constant length, is in the form of a pivoting arm. The rotations of the mirror M1 and of the filter FS1 are brought about, for example, by the pressure of rectilinear arms rolling on cylindrical rollers held against said arms by springs (not shown).

It should be noted that the self-alignment devices described above can be used for various applications, for example in X-ray spectrometry, components M1 and FS1 being replaced by crystalline laminae of the same type. These self-alignment devices also permit optical measurements to be taken at variable incidence on a sample placed on the filter FS1, without displacing the beams and without modifying the polarisation directions.

These self-alignment devices can also be used in diffraction grating monochromators in which the two gratings replace the components M1 and FS1 which rotate strictly by the same angle, the axis of the collimator and the output axis being fixed.

Finally, these self-alignment devices can be used in all types of interferometer systems requiring a variable angle of incidence, for example FABRY PEROT-type interferometers.

What we claim is:

1. An improved spectrum analysis device which includes
   a source which can generate excitation radiation of a predetermined wavelength;
   means for guiding the excitation radiation onto a sample placed in the location;
   a separator filter which can reflect, in a first direction, a first spectral band of the radiation it receives and which transmits, in a second direction, the remainder of the radiation which it receives, the first spectral band being centered on the wavelength of the excitation radiation and the remainder of the radiation transmitted by the separator filter corresponding to a desired RAMAN spectrum:

means for collecting the radiation coming from the sample excited in this way, and guiding it onto the separator filter;

spectral detection and analysis means disposed in the second direction; and means for collecting the RAMAN spectrum transmitted by the separator filter, and guiding it onto the detection and analysis means, wherein the improvement comprises:

a band-eliminating filter with a steep band eliminating slope, which filter can reject a second spectral band which is narrower than the first spectral band, and embracing the wavelength of the excitation radiation:

means for collecting the first spectral band of the radiation reflected by the separator filter and guiding it onto the band-eliminating filter in order to eliminate therefrom the second spectral band: and means for collecting the signal corresponding to the first spectral band from which the second narrow band has been eliminated in this way by the band-eliminating filter and guiding the signal onto optical means which combine it in the second direction with the RAMAN spectrum transmitted by the separator filter, so that the detection and analysis means process the complementary radiations combined in this way.

2. A device according to claim 1, wherein the detection and analysis means can process simultaneously the complementary radiations combined in this way.

3. A device according to claim 1, wherein the detection and analysis means are selected from the group consisting of Fourier transform spectrometers, monochannel detection diffraction spectrometers, and multichannel detection diffraction spectrometers.

4. A device according to claim 1, wherein the optical combination means comprise the separator filter arranged so that it reflects in the second direction the first spectral band from which the second narrow band has been eliminated.

5. A device according to claim 1, wherein the optical combination means comprise an auxiliary separator filter which can be adjusted separately relative to the separator filter in order to reflect in the second direction the first spectral band from which the second narrow band has been eliminated.

6. A device according to claim 1, wherein the separator filter has a high reflection coefficient for the excitation line to be eliminated, a relatively wide elimination band relative to that of the excitation line to be eliminated, and a high transmission coefficient outside the elimination band.

7. A device according to claim 6, wherein the separator filter operates by multiwave interference; and the separator filter is selected from the group consisting of notch filters, filters with semi-transparent mirrors, reflection interference filters, ASHER colloidal filters, dielectric multilayer filters, Lippman-type filters with an index grating, and holographic-type filters.

8. A device according to claim 1, wherein the band-eliminating filter is selected from the group consisting of absorption filters, FABRY PEROT-type interferometer filters, and dispersing system-type filters.

9. A device according to claim 8, wherein the band-eliminating filter comprises a double subtractive monochromator having two diffraction gratings and a reflection/transmission light trap, interposed between the two gratings, in order to allow the excitation radiation to pass along on optical path towards the sample in an advance direction of the optical path, and in order to trap the excitation radiation present in the first spectral band in a return direction of the optical path.

10. A device according to claim 1, wherein the separator filter is mounted so as to pivot and can receive the radiation scattered by the sample in an incidence direction corresponding to the second direction and reflect the first spectral band in the first direction, and wherein the means for collecting the first spectral band comprises a deviation-compensating component which receives the first spectral band after reflection thereof by the separator filter and which then reflects the first spectral band in a third predetermined direction, and a mechanism which carries the deviation-compensating component such that the deviation-compensating component rotates by the same angle as that of the separator filter in order to reflect the first spectral band in the third predetermined direction.

11. A device according to claim 10, further comprising a support for the separator filter, the support having an aperture and being fixed with respect to translation, and wherein the mechanism comprises a bracket having an angle $\gamma$ in which $\gamma=(180+C)°/2$, C being an angle between the incidence direction and the third direction, the bracket additionally having:

a first rigid leg mounted so as to slide in translation through the aperture in the support of the separator filter; and a second rigid leg bearing the deviation-compensating component;

the the bracket having an apex which is movable in translation along an axis disposed at a bisecting angle between the incidence direction and the third direction.

12. A device according to claim 11, wherein the first rigid leg remains perpendicular to the separator filter when the latter rotates and during the translation of the apex of the bracket.

13. A device according to claim 11, wherein the second rigid leg remains perpendicular to the deviation-compensating component during the translation of the apex of the bracket.

14. A device according to claim 11, wherein the second rigid leg remains parallel with the deviation-compensating component during the translation of the apex of the bracket.

15. A device according to claim 11, wherein the means for collecting the first spectral band further comprises control means for controlling the displacement of the movable components of the device in response to a predetermined command in order to bring about self-alignment of the inlet radiation and outlet radiation of the separator filter.

16. A device according to claim 10, wherein the mechanism comprises four legs of a constant given length, to form a lozenge having four apexes, a first one of the apexes of the legs supporting the separator filter, which pivots about an axis of rotation located in a plane perpendicular to that of the legs, a second one of the apexes of the legs supporting the deviation-compensating component, which pivots about an axis of rotation located in a plane perpendicular to the legs, a third one of the apexes of the legs supporting a slide, which can guide the third one of the apexes in translation along a diagonal of the lozenge, and a fourth one of the apexes of the legs supporting another slide which can guide the fourth one of the apexes in translation along a further diagonal of the lozenge, the leg between the first one of the apexes and the fourth one of the apexes being mounted so that it can slide in translation along an axis parallel with the incidence direction, and the leg between the second and of the apexes and the third one of the apexes being mounted so as to slide in translation along an axis parallel with the incidence direction; and wherein, in response to a rotation of the filter by a predetermined angle, the two slides are displaced simultaneously such that the deviation-compensating component rotates by the same angle, so as to receive the first spectral band and reflect the first spectral band in the third predetermined reflection direction.

17. A device according to claim 12, wherein the means for collecting the first spectral band further comprises control means for controlling the displacement of the movable components of the device in response to a predetermined command in order to bring about self-alignment of the inlet radiation and outlet radiation of the separator filter.

18. A device according to claim 13, wherein the means for collecting the first spectral band further comprises control means for controlling the displacement of the movable components of the device in response to a predetermined command in order to bring about self-alignment of the inlet radiation and outlet radiation of the separator filter.

19. A device according to claim 14, wherein the means for collecting the first spectral band further comprises control means for controlling the displacement of the movable components of the device in response to a predetermined command in order to bring about self-alignment of the inlet radiation and outlet radiation of the separator filter.

20. A device according to claim 10, further comprising a support for the separator filter, the support having an aperture and being fixed with respect to translation, and wherein the mechanism comprises a bracket which is movable in translation, the bracket having a first rigid leg which slides through the aperture in the support of the separator filter and a second rigid leg which bears the deviation-compensating component.

21. A device according to claim 20, wherein the first rigid leg remains perpendicular to the separator filter when the later rotates and during translation of the bracket.

22. A device according to claim 20, wherein the second rigid leg remains perpendicular to the deviation-compensating component during translation of the bracket.

23. A device according to claim 20, wherein the second rigid leg remains parallel with the deviation-compensating component during translation of the bracket.

24. A device according to claim 20, wherein the means for collecting the first spectral band further comprises control means for controlling the displacement of at least the bracket in response to a predetermined command.

* * * * *